United States Patent
Cheliotis et al.

(10) Patent No.: US 7,742,960 B2
(45) Date of Patent: Jun. 22, 2010

(54) METHOD AND DEVICE FOR CALCULATING A PRICE FOR USING A SPECIFIC LINK IN A NETWORK

(75) Inventors: Georgios Cheliotis, Zurich (CH); Christopher M. Kenyon, Langnau (CH)

(73) Assignee: International Business Machines Corporation, Armonk, NY (US)

( * ) Notice: Subject to any disclaimer, the term of this patent is extended or adjusted under 35 U.S.C. 154(b) by 1860 days.

(21) Appl. No.: 10/475,185

(22) PCT Filed: Apr. 2, 2002

(86) PCT No.: PCT/IB02/01187

§ 371 (c)(1), (2), (4) Date: Mar. 19, 2004

(87) PCT Pub. No.: WO02/085045

PCT Pub. Date: Oct. 24, 2002

(65) Prior Publication Data

US 2005/0278262 A1    Dec. 15, 2005

(30) Foreign Application Priority Data

Apr. 18, 2001 (EP) .................................. 01109572

(51) Int. Cl.
*G06Q 40/00* (2006.01)

(52) U.S. Cl. ........................... 705/35; 705/30; 705/34; 705/400

(58) Field of Classification Search .................. 705/34, 705/400, 30, 35; 709/223, 226

See application file for complete search history.

(56) References Cited

U.S. PATENT DOCUMENTS 6,208,977 B1 * 3/2001 Hernandez et al. ............ 705/34

(Continued)

FOREIGN PATENT DOCUMENTS

CA     2406418 A1    10/2001
WO    WO 02/085045   * 10/2002

OTHER PUBLICATIONS

Georgios Cheliotis and Christopher Kenyon, Dynamics of Link Failure Events in Network Markets, 2002.*
Ahmed Ben Cheikh and Andre Girard, Pricing and Design of B-ISDN Networks, IEE, 1996.*

*Primary Examiner*—Hani Kazimi
*Assistant Examiner*—Hao Fu
(74) *Attorney, Agent, or Firm*—McGinn IP Law Group PLLC; Stephen C. Kaufman, Esq.

(57) ABSTRACT

The invention relates to a method for calculating in a network that comprises links, a price for using a specific link in the network. The method comprises the following steps:

a) a comparison step for determining a price difference between the price for using the specific link and the price for using instead of the specific link an alternative path in the network, which does not comprise the specific link, b) a change-calculation step for determining a link-price change in the price for using the specific link, and a link-price change in the price for using the links in the alternative path, in response to the determined price difference, c) a combination step for combining for the specific link the determined link-price changes on the price for using the specific link from all links in the network, to determine a total price-change for the specific link, d) a merging step for merging the determined total price-change with a market-induced price change in the price for using the specific link, to calculate the price for using the specific link, wherein the market-induced price change is being driven by at least one random variable.

25 Claims, 6 Drawing Sheets

U.S. PATENT DOCUMENTS

| | | | |
|---|---|---|---|
| 6,631,413 B1 * | 10/2003 | Aggarwal et al. | 709/226 |
| 6,965,867 B1 * | 11/2005 | Jameson | 705/8 |
| 7,363,371 B2 * | 4/2008 | Kirkby et al. | 709/225 |
| 2002/0004788 A1 * | 1/2002 | Gros et al. | 705/80 |
| 2005/0240539 A1 * | 10/2005 | Olavson | 705/400 |
| 2007/0192463 A1 * | 8/2007 | Kaplan | 709/223 |

* cited by examiner

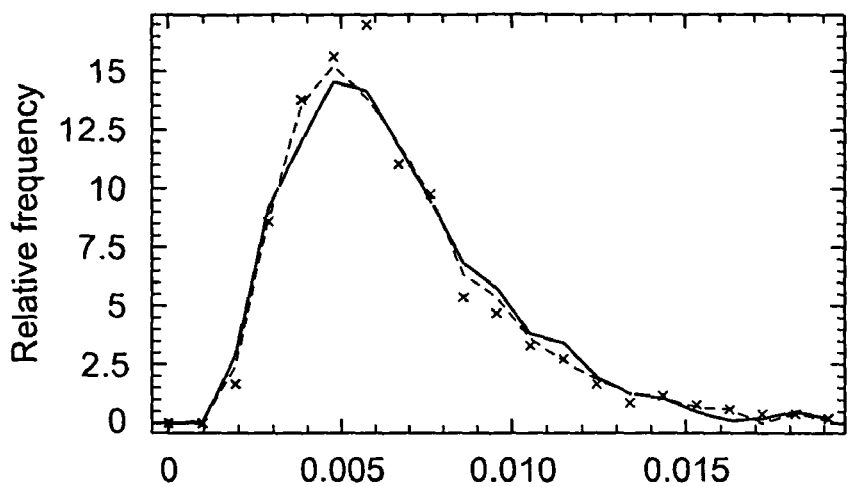
Fig. 11a Dollars per DS3 mile per month
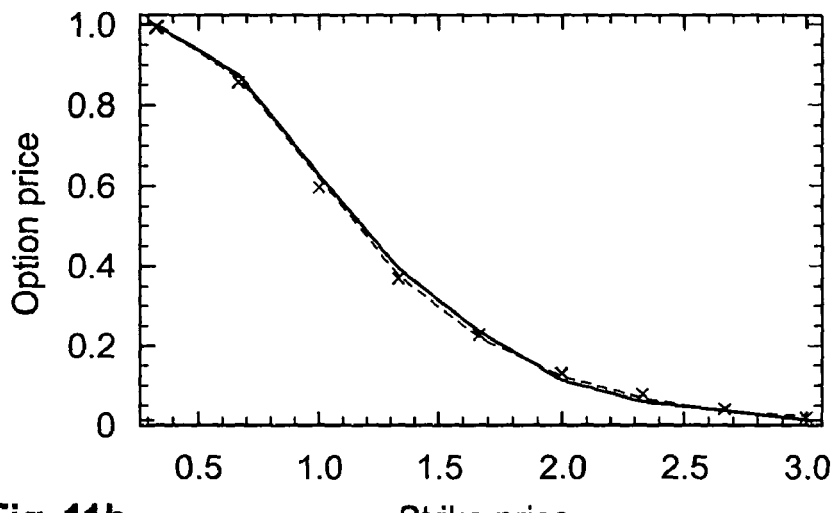
Fig. 11b Strike price
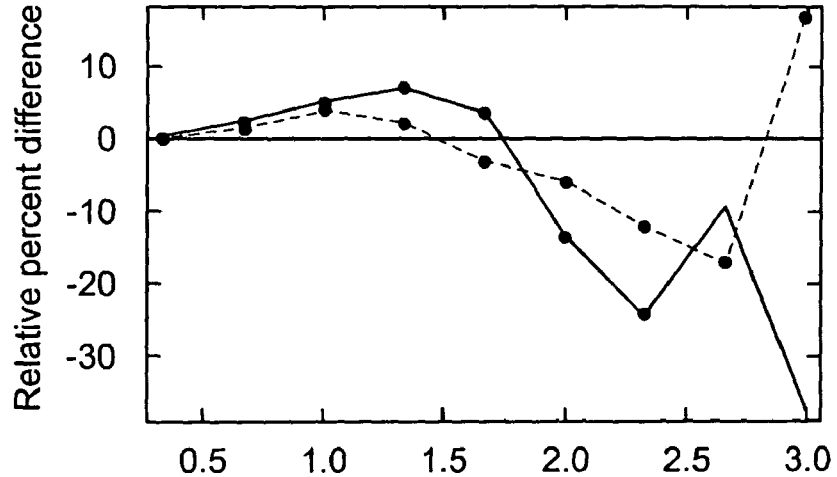
Fig. 12 Strike price

US 7,742,960 B2

METHOD AND DEVICE FOR CALCULATING A PRICE FOR USING A SPECIFIC LINK IN A NETWORK

The invention relates to a method and a device for calculating a price for using a specific link in a network. In particular it relates to a method and device making a decision based on the calculated price.

TECHNICAL FIELD AND BACKGROUND OF THE INVENTION

Bandwidth is becoming commoditized and markets are starting to appear. Potential behaviors of these markets are not understood because these markets are still in the early stages of development. This is reflected in the lack of current research on the structure and dynamics of network commodity market prices. A method is presented for constructing telecom commodity spot price processes. Bandwidth, like electricity, is not storable, so inspiration is drawn from electricity prices and models. However, unique network features of telecommunications require specific inclusion. These are: geographical substitution, referred to as arbitrage; quality of service (QoS); and the continuing pace of technological development. Developing liquidity acts as a further complication. Liquidity refers to the ease with which partners for trades at a given price can be found. Geographical arbitrage means that spot price development on point-to-point links cannot be understood in isolation from price development on alternative paths with equivalent QoS. This implies some form of price modification derived from load-balancing across appropriately specified QoS limited alternative paths. Technological development continually pushes prices down as new equipment is installed by competitors. So, unlike other commodities, the prices revert towards a mean whose drift is strongly structurally downwards. Market liquidity is quantified as the extent to which geographical arbitrage modifies link-prices. Thus price development is modeled as a combination of link-price processes modified by prices for equivalent QoS paths. The presented model covers the existence and value of arbitrage opportunities together with its effect on price development and network present-value (NPV). Application of this work ranges from network design to infrastructure valuation and construction of real options. 1998, McGraw-Hill, New York, a pricing model for energy markets is described which is very similar to a model for general commodities which was exactly equivalent to an earlier model under a linear transformation of parameters, described in "The stochastic behavior of commodity prices: implications for valuing and hedging", E. Schwartz. 1997, J. Finance 52, pp. 923-973, The observations of congestion on the Internet suggest however, that even for single links, these models are insufficient because they do not include spikes or jumps in prices. Price spikes are particular features of electricity prices and some modelling has been done there as described in "Stochastic models of energy commodity prices and their applications: mean-reversion with jumps and spikes", S. Deng, 1998. PSERC working paper 98-28, readable at http://www.pserc.wisc.edu/.

The international publication WO 00/54198A2 refers to a system, method, software, and portfolios for managing risk in markets relating to a commodity delivered over a network, in which a market participant constructs portfolios of preferably liquid price risk instruments in proportions that eliminate the Spatial Price Risk for the market participant's underlying position. Techniques are also disclosed for constructing and evaluating new price risk instruments and other sets of positions, as well as identifying arbitrage opportunities in those markets.

Apart from link-price processes in isolation there is the question of network effects in the sense of interactions. The most important network effect here is geographical arbitrage, i.e. the existence of many prices for end-to-end capacity at equivalent QoS. This has been observed in the market. Detection of such arbitrage opportunities is in general an NP complete problem based on shortest path algorithms with side constraints. A variety of pseudo-polynomial time algorithms exist that result from quantification of these constraints as is to be expected under commoditization. Geographical arbitrage opportunities could exist in the forward market even with a no-arbitrage situation in the spot market. There is vast computer science literature on price-setting for network resources in order to achieve some aim, e.g. social welfare maximization, cost-allocation, congestion control, etc. Here price dynamics are approached from a completely different direction in that it is started from modelling the price process rather than modelling supply and demand and then solving for the best price in some sense relative to a given network.

OBJECT AND ADVANTAGES OF THE INVENTION

It is an object of the invention to provide a method for calculating a price for using a specific link in a network. The method can be used to model for the expected telecom commodity price dynamics using a link-price process together with link-price modifications due to network effects.

According to a first aspect of the invention as set forth in the claims a method is provided in which link-price changes are calculated based on a price difference, the link-price changes are combined over the network and the result is merged with market-induced price changes in order to calculate the subsequent occurring price.

According to a second aspect of the invention a method is provided wherein a decision whether to increase, decrease or maintain a transport capacity demand, the action of changing the demand accordingly, selling, buying or holding transportation bandwidth or the network or a sub-network thereof is performed.

This method has the advantage that the price calculation takes into account link-price changes that occur on a link independent from other links and also link-price changes that occur in dependence on the other links in the same network.

If the market-induced price change is modeled to comprise one or more functions of a Brownian price-change, a Levy price-change, an Ito price-change, a Poisson price-change, a semi-Markov price-change and/or is modeled to comprise a function for price-spikes and/or price-jumps, this provides a relatively precise picture of the true price development that occurs in real networks.

The same reality aspect holds true for a change-calculation step in which the relation between the determined price difference and the link-price change is modeled with an arbitrage-correction function that comprises a term for the quantification of market liquidity.

To set the link-price change on the specific link equal to the link-price change in the links of the alternative path, is a model that makes the calculation relatively simple, assuming an overall constant demand, which assumption is allowed for a time period that is shorter than a predetermined time unit, being observable for the corresponding network.

The change-calculation step may comprise a shift-calculation step for determining an amount of an existing transport capacity demand that is to be shifted from the specific link to the alternative path in response to the determined price difference, and an effect-calculation step for determining the link-price change effected by the determined transport capacity demand, that is to be shifted, on the link-price for using the specific link. This mechanism of demand reacting on the price difference is a model that gives a simple but realistic picture of real-world network demand behavior. When the transport capacity demand is approximated with a linear function this provides a good simplification of the calculation mathematics which nevertheless is accurate enough to provide acceptable results. The same holds true for the modelling of a transport capacity supply as having a constant elasticity.

The amount of demand to be shifted from the specific link to the alternative path may be assumed positive, thereby taking into account the fact that the price difference situation is insofar asymmetric as a cheaper alternative path will redirect demand to this path but a more expensive alternative path will not necessarily lead to a corresponding demand shift from that alternative path to the path/link looked at.

A decision step for deciding in view of the calculated link-price, whether to increase, decrease or maintain the transport capacity demand for transporting a unit, preferably an information unit, over the specific link or the alternative path, is a practical and advantageous application of the calculation result because the calculation result will determine the price at which the demand can be satisfied, leading to a corresponding contract, which is naturally oriented to be closed as cheaply as possible for the demander. The demander may hence in a demand-change-step increase or decrease the transport capacity demand for transporting the unit over the specific link or the alternative path in response to the calculated link-price.

Another advantageous application would be an action-step comprising one of a buy/hold/sell action for transportation bandwidth on the network in response to the calculated link-price, making the bandwidth a traded good, allowing to make profit from the determined price difference.

Executing the above method several times sequentially to provide a link-price series comprising several of the subsequent calculated link-prices, leads to a preciser and timewise longer price calculation which allows to look more into the probable future of price development. This step can be repeated also to provide several of the link-price series. Such series can then be used in a discounting step wherein the link-prices within the link-price series are discounted back to their present-value, thereby providing discounted price series, which in an integration step can be integrated for the network or a sub-network thereof, to obtain therefrom a network present-value for the network $G_n$ or a sub-network thereof. Such a network present-value can be advantageously used as basis for a decision step comprising one of a buy/hold/sell action for the network or the subnetwork.

Yet another advantageous application would be an adaptation step wherein the transport capacity of the specific link or a different of the links in the network is changed in response to the calculated link-price, e.g. by changing transmission equipment, such as switches, cross-connects, repeaters, multiplexers, amplifiers, fibers, or settings thereof. This provides a network which is adaptively operated in a manner responding to the calculated price. The network capacity can thereby be improved, e.g. by increasing the network capacity in paths which are expensive, in order to attract demand.

SUMMARY OF THE INVENTION

The invention is directed to a method for calculating in a network that comprises links, a price for using a specific link in the network. The method comprises the following steps:

a) a comparison step for determining a price difference between the price for using the specific link and the price for using instead of the specific link an alternative path in the network, which does not comprise the specific link, b) a change-calculation step for determining a link-price change in the price for using the specific link, and a link-price change in the price for using the links in the alternative path, in response to the determined price difference, c) a combination step for combining for the specific link the determined link-price changes on the price for using the specific link from all links in the network, to determine a total price-change for the specific link, d) a merging step for merging the determined total price-change with a market-induced price change in the price for using the specific link, to calculate the price for using the specific link, wherein the market-induced price change is being driven by at least one random variable.

DESCRIPTION OF THE DRAWINGS

Examples of the invention are depicted in the drawings and described in detail below by way of example. It is shown in FIG. 1 an example of a network with three nodes and three edges, FIG. 2a a graph depicting for an edge the relation between price p and quantity of demand q under the influence of a price change removing demand x from that edge, FIG. 2b a graph depicting for an edge the relation between price p and quantity of demand q under the influence of a price change moving demand x to that edge, FIG. 3 a network with two nodes connected via various paths under the influence of demand shifting, FIG. 4 a flow chart for the method of calculating a new price in a price-dynamic network according to FIG. 1.

All the figures are for sake of clarity not shown in real dimensions, nor are the relations between the dimensions shown in a realistic scale.

DETAILED DESCRIPTION OF THE INVENTION

Figure 1:
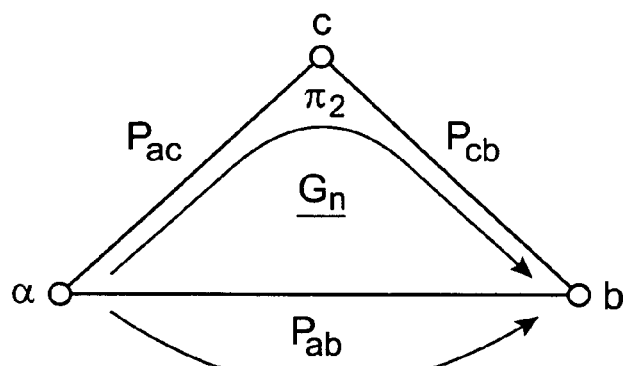

In the following, various exemplary embodiments of the invention are described. In FIG. 1 a network, also referred to as graph $G_n$, comprising a first node a, a second node b, and a third node c is depicted. The first node a is connected to the second node b via a first link ab. The first node a is connected to the third node c via a second link ac. The third node c is connected to the second node b via a third link cb. A first path $\Pi_1$ leads from the first node a to the second node b and comprises the first link ab. A second or alternative path $\Pi_2$ leads also from the first node a to the second node b. This alternative path $\Pi_2$ comprises the second link ac and the third link cb. On each of the links ab, ac, cb, a corresponding price $p_{ab}, p_{ac}, p_{cb}$ is valid at a certain point in time. These prices $p_{ab}, p_{ac}, p_{cb}$ are the prices charged to a network user by a service provider, who may be the network owner or renter, for the service of providing at that point in time a specific amount of transport capacity on the corresponding link ab, ac, or cb for allowing transportation units over that link ab, ac, or cb. The network can be any transportation network, such as a street network, a mail delivery network, or as exemplarily selected here, a communication network. The units to be transported over the communication network are information units, e.g. data packets. A particular example could be data traffic over the Internet or a telecom network.

The bandwidth is a geographically distributed commodity and in real information networks the major long-distance suppliers form an oligopoly. For understanding the factors that influence the information-unit traffic and the pricing therefor in such a network, in the following an overview is given.

Geographical arbitrage: This means that, given equivalent QoS, the cheapest of all available paths will set the end-to-end price in a competitive liquid market. This is due to the fact that the actual path is irrelevant with respect to information transport, as long as certain QoS requirements are met. The set of paths connecting two given geographical locations at the same QoS level are perfect substitutes.

Such arbitrage is not present in electrical networks because an electrical network is a whole and individuals do not have alliterative paths exception the sense that aggregate can be logically divided in different ways. Thus an electricity network is a coherent whole, with energy according to well-understood laws of physics. The bandwidth market has no corresponding inherent large-scale feature. The requirement that supply and demand must balance in electricity leads directly to pool-type price discovery mechanisms. In data transmission, routing/switching protocols state the laws for the formation of flows. The choice of protocols and the possibility to combine several complementary technologies allow for a much higher degree of flexibility and control over data routing. This degree of control is indeed used for the design and operation of efficient data networks and obliviates any requirement for centralized pool pricing. Electrical power networks are a means of distribution of energy, with energy being the traded asset in the electricity market, whereas data networks are themselves the underlying of every bandwidth contract.

Supply/demand disassociation: This refers to the fact that the demanded product is not always the one supplied. In electricity markets, the demand is e.g. for power at one location but the power is usually supplied from another location. This has been a particular problem in some markets where power was available at one location but, for congestion or legal reasons, could not be transported to where it was needed. In bandwidth markets, the demand is for an end-to-end service but the actual supply is made—at a physical level and an investment level—on a link-by-link basis. Collections of links may be owned by single entities, such that for subsets of the whole network the investment policy will have some coherence. Also new links can be created, but the disassociation remains.

Network effect: The network effect is the argument of increasing economies-of-scale, which means that the utility of a service grows with the number of people—or devices—that are attached. In general the utility grows with some power of the number of users, not simply linearly. The increasing economies-of-scale, if it is present at all in electricity networks, is a linear or sub-linear phenomenon. More users of electricity means a bigger market for electrical devices, but there is little interaction. The openings for new consumption of electricity are very limited. On the contrary, demand for bandwidth is continuously increasing, largely due to network effects. Network effects will be used further below to describe the effect of geographical arbitrage on price development.

Non-storability: Inventories act to smooth variations in supply and demand. When no inventories exist, prices can jump if supply or demand changes suddenly. Prices can also change suddenly when the perception or expectation of the supply- or demand status suddenly changes. Bandwidth is non-storable, so price jumps and spikes can occur. Non-storability is a determining factor in electricity price modelling. Jumps and especially spikes are observed due to weather events sometimes in combination with equipment failures. In fact, even in commodities where storage is possible, like oil, large-scale political events can cause jumps and spikes in the price.

Trading and settlement time-scale: In some electricity markets 30-minute and even 10-minute blocks are priced, traded and settled. To date, bandwidth contracts have had the character of the regulated electricity industry, i.e. month- or year contracts are the norm. With universal trading contracts, i.e. b and width deregulation and contact feature standardization, and carrier-neutral pooling points, this is expected to change and approximate the electricity market much more closely.

Liquidity: Currently the bandwidth market is less liquid than the electricity market or many other commodity markets. Trading-volumes are picking up and ongoing deregulation of the industry along with universal trading contracts will assist in reaching higher levels of liquidity. In any case, not all traded locations are expected to be equally liquid in the future.

Demand inelasticity: Provided that most consumers do not react on the time-scale of market trading and settlement, demand inelasticity will be a feature of total point-to-point demand on that time-scale. On an individual-link basis, demand will be elastic thanks to automation technologies, such as software agents, electronic auctions and least-cost routing which allow for fast switching between substitutes, i.e. alternative paths. This elasticity will exploit market liquidity and also contribute to it. Inelastic demand is a current feature of short term electricity markets. In the assumption of inelastic point-to-point demand, some care should be given to network effects which involve only demand-shifting between substitutes, and not changes in total demand. This is why in the analysis that follows it is assumed that point-to-point demand is conserved, whereas generally demand for a particular substitute is fairly inelastic but not necessarily completely inelastic.

Growth: The Internet, and the available network bandwidth have had periods of 100% growth every 3 to 4 months. In the last few years this has slowed to only 100% per year. In addition, substantial amounts of dark fibers are being laid to take advantage of and push further growth. The energy industry is growing at a much slower rate than the Internet or bandwidth. In fact energy growth in the First World is barely 5% per year, if that. This is partly because of increasing efficiency.

Deregulation: In the bandwidth market a transition is going from mostly closed proprietary networks towards interoperable networks. The interoperability takes the form of a common infrastructure layer, e.g. IP, open public points of interconnection and universal trading contracts (UTC) with QoS guarantees. These UTCs will have effects that mirror those from deregulation in the conventional utilities markets. In these markets deregulation has appeared over a period of years and in a highly heterogeneous fashion. This development can be expected to also appear in bandwidth markets. However instead of geographically restricted patches there will be increasingly linked interconnection points.

Technological development: A dominant factor is bandwidth development. There are two related areas: bandwidth and switching/routers. Bandwidth increases with both the increase in packing down a single wavelength and also with the increase in the number of wavelengths that can go down a single fiber, e.g. using Dense Wavelength Division Multiplexing, DWDM. Since switches are inherently parallel devices they also exhibit this combination of improvements: They improve as chips improve, and they improve with packing multiple switching units. There is also an expected transition to all-optical wavelength-switching within the next 5 to 10 years. The combined effect of technological development and competition leads to a continuous drop in the cost of transporting a Megabit per second per mile.

Capacity expansion: It takes a relatively long time to build a new fiber network and many months to put a new long-distance conduit in place. However, once the conduit is in place new fibers can be added relatively quickly. Also, conduits can house dark fibers, i.e. cables without the equipment that is necessary for transmission. In addition, with multimode fibers and DWDM, more wavelengths can be added to those already present in a lit fiber. If new equipment is required, this depends on manufacturers schedules. Thus, different amounts of capacity can be added over a range of time-scales. This is different from electricity where the shortest time-scale for adding significant new capacity is a year.

Supply elasticity: Suppliers of bandwidth may have significant flexibility in assigning network resources for the fulfillment of different end-to-end contracts. This is due to routing- and bandwidth management tools which allow for a number of different allocations, depending on the type of contracts the supplier wishes to offer. The amount of flexibility depends on the design of the underlying network. Generally, a network with more switching points will provide more flexibility at the expense of QoS, because more contention/failure points are added. In a similar manner, a power plant's resources can be assigned to different markets, but the allocation problem is different since it occurs only at one place, namely the plant, not on the distribution network.

Supply/demand balance: Utilization studies have given widely varying results for different parts of the Internet and for private networks, with results going from a few percent for some Internet backbones to observations of congestion on some links or switches at different days or time of day. Some next-generation research networks and especially backbones offering higher service-quality are underutilized, but there is little, if any, evidence that the same holds for other large parts of the global infrastructure, such as corporate intranets. This appears to be similar to electricity in general with the observation of congestion, i.e. blackouts in electricity markets, but the driving factors are different. In electricity the biggest factors driving congestion are weather and equipment failure. The latter occur rather frequently in data networks.

Term structure of volatility: In commodity markets in general one of the stylized facts is that there is more volatility in the short-term forward market than in the long-term forward market. It is also usual that for non-investment commodities this volatility does not asymptote to zero. In the bandwidth market, whilst in some very long term there may be stability, it appears more likely that in a reasonable planning horizon there are increasing levels of uncertainty. So far prices are continuously falling, with rare exceptions, but even if it is assumed that this trend will continue, there is significant uncertainty concerning the rate of decline, both on a global and local level.

Positive prices: Prices for bandwidth are assumed to be positive. In energy markets, zero real prices are observed because large thermal or nuclear plants cannot ramp down the supply as quickly as demand can drop. Thus, when demand is very low and drops suddenly these plants may give away power for free as this is their only means of disposal. That is, in electricity, there is no free disposal.

Price Development

Above the factors that influence the development of bandwidth prices in general have been described. In the following it is described how these factors combine to give specific models for traded commodities. The inputs to price development are:

a graph $G_n$ of traded contracts C;

initial link-prices p, also referred to as contract prices $C_{init}$;

a network function f which expresses how arbitrage opportunities are removed by market forces a time constant for their removal, i.e. the market liquidity $\tau$;

stochastic process models for each link.

A contract C is an agreement between a supplier and a buyer, whereby the buyer agrees to pay a specific price p and the supplier agrees to in exchange supply a specific network capacity to the buyer. The price development is such that observed prices, i.e. a market-observed outcome, $C_{arb}$ may contain arbitrage opportunities. Market forces act both to remove the existence of arbitrage and to disturb the link-prices via normal and unusual information and changes in supply and demand. These two processes in general combine to produce the next set of observed link-prices. The arbitrage removal occurs relative to the observed state of contract prices.

However, other market forces are still acting and this occurs at the same time. Thus the new state may not be arbitrage-free, even with a high liquidity, because there is always the potential for new arbitrage opportunities to be created. In practice the two forces, geographical arbitrage removal and market-induced price changes, can be modeled separately or in combination. For simplicity, they will first be described separately and then a combined formulation will be given.

When considering bandwidth prices, i.e. link-prices, one should be precise on what exactly are the underlying traded commodities. Price development is here modeled at a link level. The links ab, ac, cb can be defined as indivisible contracts C offered between pooling points, also referred to as the nodes a, b, C. Such a pooling point is a facility for the exchange of traffic at a particular geographical point among trading partners in the commodity market. Any party may combine the link contracts C to form end-to-end contracts. Equally, any party buying such an end-to-end contract may be able to split it according to the pooling points, i.e. nodes, along the path Π to create new link or multi-link contracts. Thus, the prices p between any pair of nodes a, b, c may be observed on the market, but these are formed from the link-prices. Multi-link-price processes are here not modeled directly.

Link-price development is modeled as a combination of three factors: link-price changes, geographical arbitrage, and liquidity. If the market is completely illiquid then if a geographical-arbitrage opportunity appears, there will be no action by the market participants affecting the link-prices p to move the market in a direction to remove the opportunity. This means, traffic, being the flow of transportable good following a contract C, will not take the cheapest available path P if the market is illiquid. On the other hand in a completely competitive, i.e. liquid, market, arbitrage opportunities will only last at most until the next trade occurs. Liquidity is hence the factor that describes the ability of the market to react e.g. with a demand shift to a price shift. The more liquid the market is, the quicker a price shift is followed by a demand shift, adapting the demand distribution to the price shift.

Independent Link Price Model

The subsequently described independent-link-price process models for the example of the first link ab the evolution of the link-price $p_{ab}$ on this link ab as if it were isolated. It hence describes the market-induced development of the link-price $p_{ab}$. Different forms of dependence can be introduced. The realized link-price $p_{ab}$ in the market for the first link ab is formed from this link-price-calculating process together with geographical arbitrage arguments and liquidity considerations. The independent-link-price process represents, as far as possible, the evolution of supply of and demand for link capacity that providers make available in the form of indivisible contracts between the nodes a, b. First, the generating equations will be described and then their rationale.

Independent Link Price

The link-price p is modeled for each link ab, cb, ac based on an Orstein-Uhlenbeck process with the addition of a process for long-term mean, spike- and jump terms. Limited regime-switching, induced by spike terms on the effective mean, are also incorporated. This process can be termed as a Shock-Regime-Reverting process or SRR process. The hypothesis is made that if there were no network around the single link then the link-price p would develop as follows:

$$X = \log(p') \qquad [1]$$

$$dX = \eta(\bar{X} + GU - X)dt + \sigma dW + GdU + HdV \qquad [2]$$

$$d\bar{X} = -vdt + \rho dZ \qquad [3]$$

U is a two state {0, 1} semi-Markov process, wherein an identification is made between the states and the numbers zero and unity, with corresponding rate parameters $\lambda_U$, $\mu_U$.

Furthermore:

$$G = \Gamma(g_U, \alpha_U) \text{ if } dU = +1, \qquad [4]$$

$$G = G \text{ if } dU \neq +1, \qquad [5]$$

wherein Γ stands for a Gamma distribution with a scale parameter g and a shape parameter α. Thus the distribution Γ(g, α) has a mean gα and a variance $g^2\alpha$. When the semi-Markov process U jumps from state {0} to state {1} then the logarithmic link-price X increases by G and the mean gα to which the process U is reverting also increases by G. When the semi-Markov process U jumps from state {1} to state {0} then logarithmic link-price X decreases by the same amount that it previously increased by and the corresponding extra term in the mean gα is dropped. Thus a link-price spike is created. The link-price p will stay in its current state for an exponentially distributed amount of time as given by the rate parameters $\lambda_U$, $\mu_U$.

V is a Poisson process with a corresponding Poisson rate parameter $\lambda_V$ and $$H = \begin{cases} \Gamma(g_{up}, a_{up}) & \text{if jump up} \\ -\Gamma(g_{down}, a_{down}) & \text{if jump down} \end{cases} \qquad [6]$$

Jumps may be equally probable in both directions or not as determined by the probability of an up-jump. These jumps act additively on the logarithm of the link-price p and hence represent a multiplication of the current link-price p.

η is the speed of link-price reversion to the average link-price $\bar{X}$; σ is the scale of a driving Brownian motion dW of short-term link-price change increments; v is the (positive) instantaneous rate of average link-price decrease and there is an uncertainty ρ about this rate which is also referred to as exponential improvement v. Since X = log p, log-normal changes in the link-price p are hypothesized. dZ is a Brownian motion of long-term link-price change increments uncorrelated with the short-term link-price change increments. $\bar{X}$ is called here an average link-price because it is the value towards which the link-price p reverts. It is not an arithmetic average. Since there is no storage there is no requirement that the process be a Martingale under any particular risk-neutral measure.

The link-price process model is hereinafter described in more detail. Since the process is a semi-Markov jump diffusion with regime-switching, the present determines the future. It is assumed that ordinary market news move the link-price continuously and are responsible for the driving Brownian motion dW of short-term link-price change increments.

Because commodity markets often show a reversion to some long-run mean and telecommunication is expected to be no exception thereto, an Orstein-Uhlenbeck process is used as the model. However, in a departure from non-manufactured commodities, e.g. oil, wheat, etc., there are non-zero expectations on the speed of telecom capacity development. The long-run mean $\overline{X}$, logarithmic in price-terms, is expected to mimic the technological development of communication capacity with its exponential improvement ν. The degree of the exponential improvement ν is not known, but an estimate may be used therefor. Whilst single-mode fiber capacity has shown exponential growth, the development of multimode transmission, e.g. DWDM, has radically improved capacity. Other such disruptive improvements are possible, e.g. long-distance transmission with no repeaters, all-optical switching, etc. This uncertainty is modeled with the scale ρ of the driving Brownian motion dZ of long-term link-price change increments. These factors represent random variables which drive the market induced price change dX.

Spikes in link-prices can be observed in electricity prices and are the result of demand being very close to available supply followed by e.g. some equipment failure. Congestion can be observed on telecom networks, as well as equipment failures leading to outages. Thus, spikes are also included as a feature in the link-price process. A spike is defined as a sudden increase in link-price followed quickly by a similar decrease in link-price. During the spike the mean for reversion is altered to include the magnitude of the spike. This change in regime is reversed when the spike ends. Spike sizes are modeled exemplarily with a Gamma distribution and generate reversible step changes in the link-price p.

Price jumps are observed in oil prices. Given that the owners of long-distance networks also form an oligopoly there is a potential for link-price jumps. These jumps may be local to a single link or more general. Jump occurrences are modeled here with a Poisson process with a given rate that describes how many jumps are expected per unit time. These jumps may be positive or negative and again are modeled with Gamma distributions.

Dependent Link Price

A form of dependence between different link-prices can be modeled by introducing correlations in the driving Brownian motion dZ for the long-term variation and the driving Brownian motion dW for the short-term link-price variation, between different links. A more network-specific form of dependence, namely geographical arbitrage, is however examined here. The introduction of a correlation structure across a node allows to model the introduction of a node on a previously undivided path. If the new node is actually redundant and all demand and supply actually crosses it, perfect correlations can be used in the driving processes on both sides of it. This does still permit separation of rare events on either side of the node.

Geographical Arbitrage and Liquidity

Geographical arbitrage is the term that is used to describe the existence of at least two different end-to-end link-prices between two nodes that are joined by a single link at a given end-to-end QoS. These two end-to-end link-prices may each be formed from one or more links but will both provide a minimum specific QoS level. In a liquid market this situation will not persist when all other factors are equal. The following definition is given:

Definition 1: A simple geographical arbitrage opportunity exists when multiple links can be substituted for a single link and when the total price of the substituted links is less than that of the single link. It is assumed that the QoS is equivalent between the single link and the end-to-end QoS of the substituting links, i.e. the links of the alternative path $\Pi_2$.

A link represents an indivisible contract. Not all contracts offered on the market may be indivisible in general. For that case the following specification of geographical arbitrage is given:

Definition 2: A geographical arbitrage opportunity exists when multiple contracts can be substituted for a single contract and when the total price of the substituted contracts is less than that of the single contract. The QoS is assumed to be equivalent between the single contract and the end-to-end QoS of the substituting contracts.

Simple geographical arbitrage provides an immediate downward pressure on the link-price of a single link. How fast this pressure acts, depends on how easy the substitute path is to identify, and how liquid the market is.

A decrease in the link-price of a single link implies that some part of the total end-to-end demand has shifted from that link to a cheaper alternative path. The increase in demand in the alternative path should result in a link-price increase on all links of that path. The question arising here is how to quantify the effect of movement of demand from a link to an alternative path at the link-price level.

However this is not the only force on the link-price of the single link. Market liquidity can act to increase the link-price under some conditions. If some of the demand for capacity is being satisfied by alternatives to the single link then, depending on liquidity, when the single link is the cheapest capacity between its endpoints demand will shift to the single link. This increase of demand will act to increase the link-price of the single link.

The competitive situation on single links will also be important. If there is only one provider, or if there is only one provider left with spare capacity, then there will also be upward pressure on the single-link-price when it is the cheapest path between its endpoints, i.e. nodes. This upward pressure will be limited by the elasticity of demand and by the price of the cheapest alternative path with an equivalent QoS.

In the following these ideas are put together. On a given link between two nodes, i.e. on which indivisible contracts are available in the market, here exemplarily the first link ab, shall be defined a set $\Lambda_{abq}$ of all paths $\Pi_1$, $\Pi_2$ between the first node a and the second node b which provide at least a QoS q. The set of prices $P_\Lambda = \{p_k | k \in \Lambda_{abq}\}$, comprises the observed link-prices $p_k$ for $\Lambda_{abq}$.

With respect to geographical arbitrage, the next link-price p' observed in the market for this first link ab, at the QoS q is given by $$p'_{abq} = (1 + e^{-\tau \Delta t} f(p_\Lambda, p_{abq})) p_{abq}, \quad [7]$$

wherein $p_{abq}$ is the previous observed link-price on the link ab at the QoS q.

This will be combined with the stochastic process for the first link ab, as described further below. Here $e^{-\tau}$ describes how fast the no-arbitrage correction $f(p_\Lambda, p_{abq})$, i.e. the development that serves to remove the arbitrage situation, takes effect. The relaxation constant τ is the quantification of the system liquidity. The liquidity is the speed with which geographical arbitrage opportunities are removed, expressed via its time constant τ. It can be derived from market observation results.

The function $f(p_\Lambda, p_{abq})$, also referred to as network function, encapsulates the degree of the arbitrage opportunities available relative to the observed link-price p for the first link ab and the appropriate correction to the link-price p. The no-arbitrage correction function f also embodies the speed and extent to which applications and electronic agents can re-balance the flow in the network $G_n$ on the time-scale of network link-price development. The link-prices p on the alternative path $\Pi_2$ will also be affected.

If the observed link-price p is the cheapest alternative out of $p_\Lambda$ then there is no arbitrage opportunity and no correction takes place.

Figure 2A:
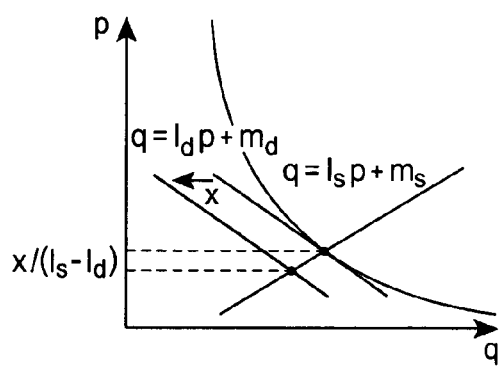

The case where there is just one cheaper alternative path $\Pi_2$ i.e. a simple geographical arbitrage opportunity, is examined next in more detail. In FIG. 2a the dependence between the demand q and the price p on the first link ab is shown. The dependence shows that the lower the price p, the higher is the demand q because a higher percentage of the network users is willing to buy network capacity at a lower price. This curve is called the demand curve. A correction on the direct link, labeled d here, from the observed price $p_d$ on that link d to the next price $p_d'$ on the same link d has the effect of a left shift x of the demand curve for that link d, because on that link d the total population that creates the demand is reduced, and hence the percentage that creates a demand for a specific price.

Figure 2B:
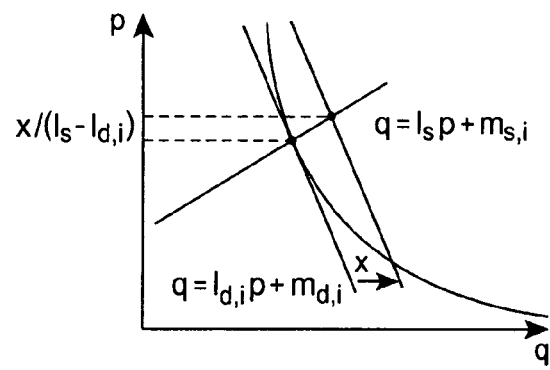

The total end-to-end demand in the network $G_n$ of is assumable to be inelastic in the time-scale examined, which is short e.g. one day, so this same demand is directed to the alternative path $\Pi_2$ and added to the demand of each link ac, cb in that path $\Pi_2$, resulting in a shift of the corresponding demand curve to the right by the same amount x, as depicted in FIG. 2b.

Figure 3:
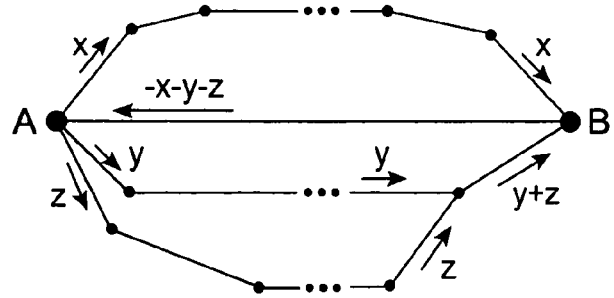

FIG. 3 shows an example of a different graph in which between the first node a and the second node b four different paths are present. A demand shift (-x-y-z) on one path results here in a corresponding total demand shift on the other, alternative paths, in that one path receives a corresponding demand shift (x), another path receives a corresponding demand shift (y) and a third path receives a corresponding demand shift (z). These shifted demands appear on all links belonging to the same path.

The demand for bandwidth can be modeled with a constant-elasticity function $q_d = Ap^{-E_d}$, where $q_d$ is the quantity demanded at a specific link-price p, $E_d$ is the price elasticity of the demand $q_d$ and A is a scaling factor. Supporting evidence for the use of such a curve for bandwidth is given, but a linear approximation of the type $q_d = l_d p + m_d$ can be seen as sufficient. This is because link-price corrections resulting from geographical arbitrage are small relative to the link-price level. So for each link d, the factor $l_d$ is computed as the slope of the tangent of the constant-elasticity function at the current link-price p.

The demand elasticity $E_d$ is uniform across several links and can be estimated from real-world data. Since the time-scale is here relatively small and the elasticity $E_d$ of the demand $q_d$ is generally inversely proportional to the time-scale, values of $E_d \geq 2$ are plausible including the case of completely inelastic demand $q_d$ where the elasticity $E_d$ goes to infinity. The scaling factor A can be estimated from market data (price and transaction volume), but in the absence of such data, the scaling factor A can be assumed to be constant and uniform across the links, with A=1.

Constant elasticity $E_s$ of supply is assumed, i.e. the market normally operates far from the point of drying out, which is expressed as $q_s = l_s p + m_s$. In a short time-scale expanding the network $G_n$ is often no option, so the only relevant factor here is the speed at which the capacity supplied on a set of ports at a node location can be altered. This depends on the network management technology employed at the nodes and in the providers' networks. Given that the nodes will employ the same or similar technologies for bandwidth management and that the total supply on each link should be dominated by the same set of long-distance providers, the factor $l_s$ is assumed to be uniform across all links. The capacity offered at the nodes can be altered at the speed of bandwidth management operations (very fast) and the incremental cost of offering one extra unit of bandwidth in this time-scale is close to zero. Therefore the supply will be very elastic and bigger than $l_d$.

For the supply elasticity $E_s$ and demand elasticity $E_d$ more accurate estimates can be obtained from market data. There is more information on long-term behavior of the bandwidth market, which is utilized in the long-run decrease of mean prices due to technology advances.

A simple arbitrage case can be resolved by treating the demand $q_d$ as a network flow which is conserved point-to-point, i.e. node-to-node while being allowed to shift from the direct link d to an alternative path so as to achieve a load-balancing effect. The result of the correction should be a state in which $$p_d - z_d x = \sum_{i=1}^{n} p_i + \sum_{i=1}^{n} z_i x \quad [8]$$

where n is the number of links in the alternative path and $z = (l_s - l_d)^{-1}$ is the change in link-price p resulting from a unitary change in quantity demanded. In this state there is no more arbitrage, so no more correction takes place. Solving this equation for x yields $$x = \frac{p_d - \sum_{i=1}^{n} p_i}{z_d + \sum_{i=1}^{n} z_i} \quad [9]$$

Knowing x, the direct link's price is corrected to $$p_d' = p_d - z_d x \quad [10]$$

and for every link on the alternative path it is corrected to $$p_i' = p_i + z_i x. \quad [11]$$

Generally, in geographical arbitrage situations there will be h>0 paths connecting the points a and b, with a price $p_h$ cheaper than $p_{ab}$. $x_k$ is defined as the amount of network flow shifting from the direct link d to all links of the alternative path $k \in \{\Lambda_{abq}/(a,b)\}$. If $x_k$ is permitted to be only positive this implies that a substitution of the alternative path for the direct link d is allowed, but not the alternative path $\Pi$ to act as substitute for another alternative path $\Pi$. There may be no end-to-end flow on a substitute path $\Pi$ even though each link may have flow. Thus in general, end-to-end flow cannot move from a multi-link substitute path $\Pi$ to anywhere, which suggests this restriction. Then the no-arbitrage state for the direct link d and the alternative path k can be written as $$p_d - z_d = \sum_{i=1}^{h} x_i = \sum_{i=1}^{n} p_i + \sum_{i=1}^{n} z_i x_k + \sum_{i=1, i \neq k}^{h} z_{ki} x_i \quad [12]$$

where $$z_{ki} = z_{ik} = \sum_{j \in k \cap i} z_j \quad [13]$$

is the sum of z's for all links that the alternative paths k and i have in common. The added complexity in the previous expression arises because the paths will generally not be disjoint. Also, $$x \geq 0 \quad [14]$$

$\Delta_k$ is the arbitrage size, i.e. the absolute difference of proposed prices between the first node a and the second node b on one hand and the path k on the other hand. The no-arbitrage state can be rewritten as follows:

$$\left(z_d + \sum_{i=1}^{n} z_i\right)x_k + \sum_{i=1, i \neq k}^{h}(z_d + z_{ki})x_i - \Delta_k = 0 \text{ or} \quad [15]$$

$$\sum_{i=1}^{h}(z_d + z_{ki})x_i - \Delta_k = 0, \quad z_{kk} = \sum_{i=1}^{n} z_i \quad [16]$$

The previous expression is extended for the path k to the following (h by h) linear system of equations, for all alternative paths k, using matrices:

$$Sx - D = 0 \quad [17]$$

where $$x = (x_1 x_2 \ldots x_h), x_i \geq 0 \quad [18]$$

$$S = z_d o_h + (z_{ij}), i, j \in \{1 \ldots h\} \quad [19]$$

$$o_h = (u_{ij}), u_{ij} = 1 \; \forall i, j \in \{1 \ldots h\} \quad [20]$$

and $$D = (\Delta_1 \Delta_2 \ldots \Delta_h)^T \quad [21]$$

This is a linearly constrained linear optimization problem. The form $Sx=D$, $x \geq 0$, where D is an arbitrage size matrix and S is a price-change matrix, is the form of a standard linear programming optimization problem, where programming is meant in the sense of method, not computer program. Linear programming problems are typically solved by either interior point (polynomial worst case) or simplex (exponential worst case but very good in practice) methods. There is a practical problem however with the construction of the matrix S, because this matrix requires all simple paths with a price less than the price of the direct link $p_{ab}$ to be found. Simple paths are those with no repeated edges. Efficient algorithms for the K-shortest simple path problem, in the sense of being polynomial time in the worst case, exist with the most efficient requiring K known in advance. However, there is a better alternative that allows to avoid constructing the price-change matrix S before starting the optimization. Using the iterative scheme described below, the constraint $x \geq 0$ is avoided because it always holds implicitly from the construction, so the load-balancing uses matrix inversion at each step.

Algorithm for Iterative No-Arbitrage

Given is the graph $G_n$ of link-prices p and the direct link-price $p_{ab}$ for the direct link d. With the expensive path set being $R=d$, the cost C of any path in R is $C(R)=p_{ab}$.

1. Find the cheapest path from the node a to the node b. It is supposed that the cost for this path is $p_{next}$ and the path is $y_{next}$.

2. If $C(R) \leq p_{next}$ then the process is finished because no arbitrage possibility remains.

3. In a load-balancing step between R and $y_{next}$ the link-prices are updated on all links in the paths in R and on the path $y_{next}$.

4. $R = R \cup y_{next}$

It is now demonstrated that the algorithm terminates and is correct. To demonstrate termination, it is to be noted that at each iteration one alternate path that was cheaper than any path in the set R, enters R and does not leave it. The graph $G_n$ is finite so the algorithm must terminate. At termination all the paths in the set R have the same cost and there is no cheaper alternative. Thus no arbitrage has been achieved and the algorithm is correct.

Next, it is explained how the load-balancing and link-price updating is done. This is achieved by applying the preceding equations, so $Sx=D$ is solved at each step. However the entering path is load-balanced with the paths in R at each step rather than load-balancing the direct link with all cheaper paths. This iterative procedure implicitly ensures that the final solution has $x = S^{-1} D \geq 0$ without having to impose this explicitly.

Combined Price Process

Two sources of price changes for a link (contract) in the network contract graph $G_n$ have been proposed: an SRR stochastic process and a load-balancing process following exploitation of geographical arbitrage. Both approaches may be combined to obtain the following stochastic differential equation:

$$X = \log(p') \quad [22]$$

$$dX = \eta(\bar{X} + GU - X)dt + \sigma dW + GdU + HdV + \psi dN \quad [23]$$

$$d\bar{X} = -\nu t + \rho dZ \quad [24]$$

These are the same equations as explained above, except for the term $\psi dN$ to describe the geographical (no-)arbitrage effects. This term embodies the network function f, and the factor $\psi$ plays the role of the previous liquidity term $\tau$. dN describes a stochastic process that is zero whenever no geographical arbitrage effects are present. When geographical arbitrage effects are present, the stochastic process term dN gives the appropriate correction to remove arbitrage from the previously observed prices in the contract network. The above equations express the fact that market forces are acting at the same time as arbitrageurs are acting to remove arbitrage opportunities by profiting from them. Indeed they are part of the market, just modeled explicitly in this case.

In general, arbitrageurs could take into account expected movements of the market as embodied in the expected value $E[\eta(\bar{X} + GU - X)]$ in the size of their actions in dN. The expectation E here would be with respect to the real measure since the underlying good is non-storable. This would become more important with low liquidity because then the time-scale of their actions would increase.

Figure 4:
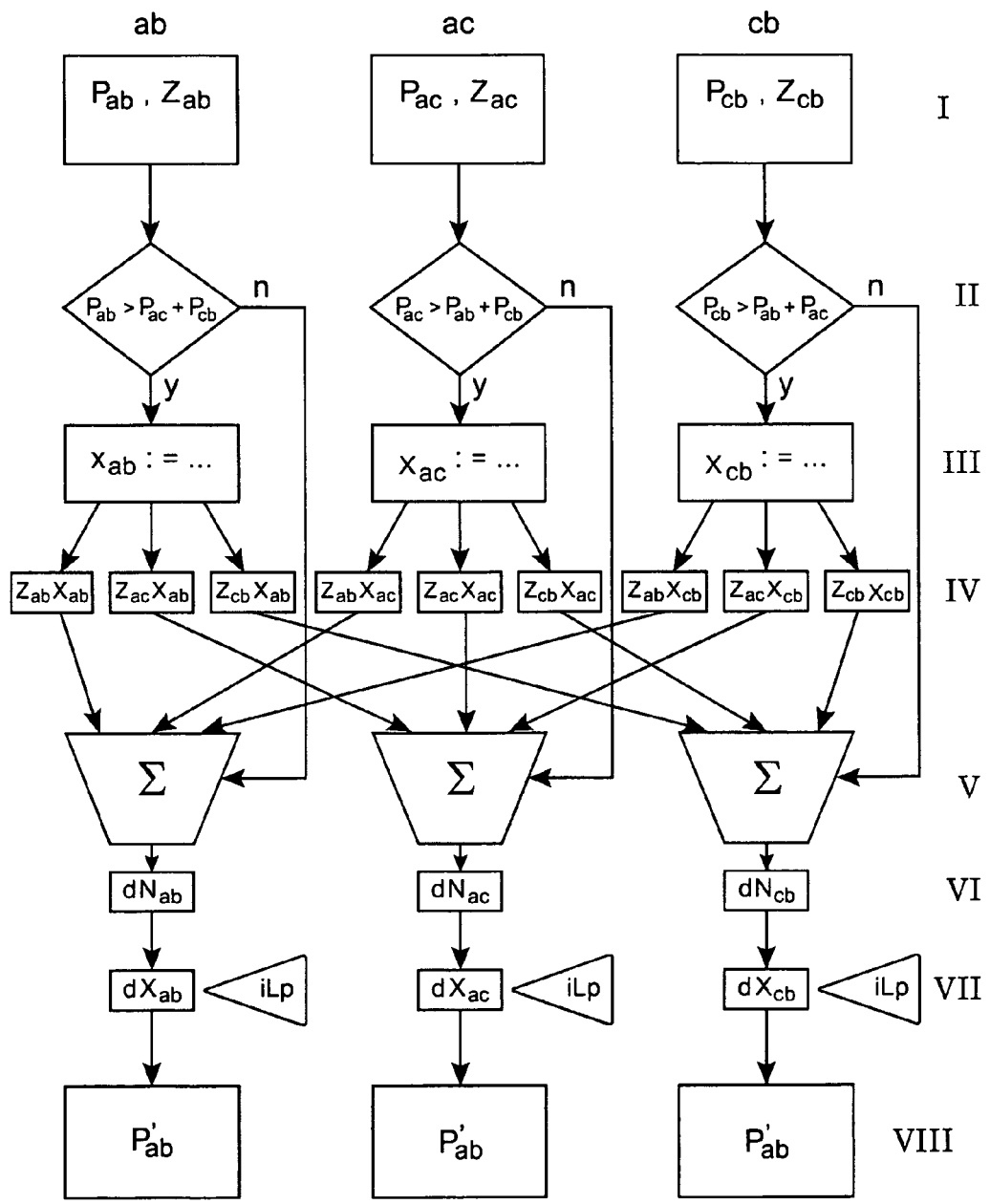
Figure 5A:
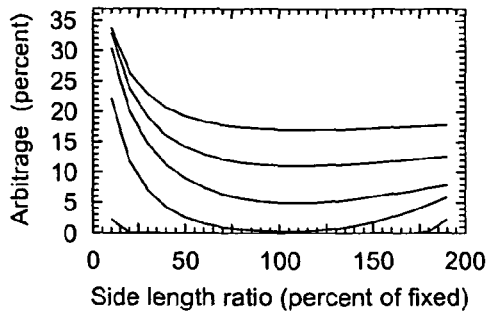
FIG. 5a the arbitrage versus the side length ratio for 10% (lowest line), 50%, 100%, 150%, 200% (highest line) of short-term price volatility at 0% long-term price trend uncertainty, FIG. 5b the arbitrage versus the side length ratio for 0% (lowest line), 10%, 20%, 30%, 40% (highest line) of long-term price trend uncertainty at 10% of short-term price volatility, FIG. 5c the net present value for the arbitrage in FIG. 5a, FIG. 5d the net present value for the arbitrage in FIG. 5b, FIG. 6a the mean price change on a fixed-length link versus short-term volatility, FIG. 6b the price change on a variable-length link versus short-term volatility, FIG. 6c the standard deviation SD of the price change on a fixed-length link versus short-term volatility, FIG. 6d the standard deviation SD of the price change on a variable-length link versus short-term volatility.
Figure 5B:
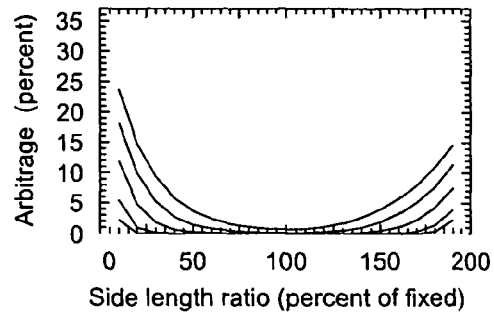
Figure 5C:
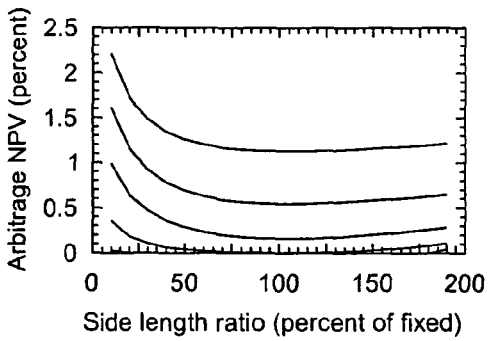
Figure 5D:
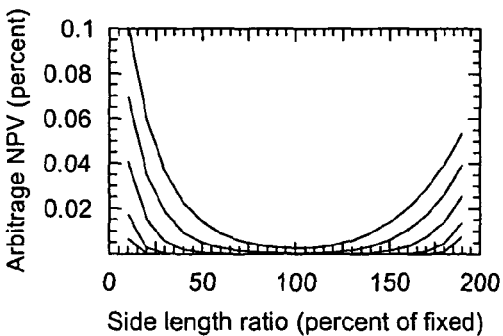

In FIG. 4, a block diagram for an algorithm for calculating the next price on the network $G_n$, as depicted in FIG. 1 is shown. For each link ab, ac, cb its current link-price $p_{ab}$, $p_{ac}$, $p_{cb}$ at a specific moment I and also the respective change in link-price p resulting from a unitary change in quantity demanded, $z = (l_s - l_d)^{-1}$ is known, wherein $l_s$ and $l_d$ are the factors derived from the linear approximations for demand $q_d = l_d p + m_d$ and supply $q_s = l_s p + m_s$, are known. (I). For each such link ab, ac, cb a comparison step II for determining a price difference between the price p for using the specific link ab, ac, cb and the price for using instead of the specific link ab, ac, cb an alternative path II in the network, which does not comprise the specific link, is performed. For the first link ab this means that it is checked whether $p_{ab} > p_{ac} + p_{cb}$. If this is the case, this means that the alternative path $\Pi_2$ is cheaper to use than the first path $\Pi_1$.

As a next step follows a change-calculation step III for determining a link-price change in the price p for using the specific link ab, ac, cb, and a link-price change in the price p for using the links in the alternative path $\Pi_2$, in response to the determined price difference. Therefor the equation [9] can be used.

$$x = \frac{p_d - \sum_{i=1}^{n} p_i}{z_d + \sum_{i=1}^{n} z_i} \quad [9]$$

This represents the demand shift x being effected by the determined price difference. It is a shift-calculation step III for determining an amount x of an existing transport capacity demand $q_d$ that is to be shifted from the specific link to the alternative path $\Pi$, in response to the determined price difference. This can be done for each link ab, ac, cb. Then the corresponding link-price change zx in each of the links ab, ac, cb is calculated (IV), i.e. $z_{ab}x_{ab}$, $z_{ac}x_{ab}$, $z_{cb}x_{ab}$, $z_{ab}x_{ac}$, $z_{ac}x_{ac}$, $z_{cb}x_{ac}$, $z_{ab}x_{cb}$) $z_{ac}x_{cb}$, $z_{cb}x_{cb}$ which is done in an effect-calculation step IV for determining the link-price change zx effected by the determined transport capacity demand $q_d$, that is to be shifted, on the link-price p for using the specific link.

In a combination step V for the specific link the determined link-price changes on the price for using the specific link from all links in the network $G_n$ are combined to determine a total price-change $\psi dN_{ab}$ for the specific link. This means that for the first link ab the terms $z_{ab}x_{ab}$, $z_{ab}x_{ac}$, $z_{ab}x_{cb}$ are combined to a common term $dN_{ab}$ (VI). Here this means that the term stemming from the respective link itself is subtracted because it represents a demand flow away from that link, while the terms stemming from the other links are added since they represent demand flow coming to that link. This means here that:

$$dN_{ab} = \log\left(\frac{-z_{ab}x_{ab} + z_{ab}x_{ac} + z_{ab}x_{cb}}{p_{ab}}\right) \quad [25]$$

and in general:

$$dN_{ab} = \log\left(\frac{-z_{ab}x_{ab} + \sum_{i,j \in \Lambda, i, i \neq ab} z_{ab}x_{ij}}{p_{ab}}\right) \quad [26]$$

This term is then multiplied with the liquidity term $\psi$, which embodies the factor that describes how fast the arbitrage is removed.

Next follows a merging step VII for merging the determined total price-change $\psi dN_{ab}$ with a market-induced price change in the price p for using the specific link, to calculate the price p for using the specific link, wherein the market-induced price change is being driven by at least one random variable. As described above, here the market-induced price change is modeled as a combination of two different Brownian motions dW, dZ, a Poisson process dV and a semi-Markov process dU. This market-induced price change is merged with the determined total price-change dN to define the logarithmic price change dX and eventually the new price p'. This means that by use of:

$$X = \log(p') \quad [22]$$

$$dX = \eta(\overline{X} + GU - X)dt + \sigma dW + GdU + HdV + \psi dN \quad [23]$$

$$d\overline{X} = -\nu dt + \rho dZ \quad [24]$$

the new price p' is calculated which can be used as a basis for a subsequent decision step.

The described algorithm hence incorporates a similar functionality as described in principle by the equation [7], namely a dependence of the new price p' on the previous price p on that link and on the other links, and on the liquidity of the underlying market, expressed by the liquidity term $\psi$.

In the decision step in view of the calculated link-price p, it is decided whether to increase/decrease or maintain the demand $q_d$ for transporting a unit, preferably an information unit, over the specific link ab or the alternative path $\Pi_2$. The new price p' is the price that based upon the observed factors will follow the previous price p on the specific link. This new price p' can be calculated for several of the links, forming a subnetwork of the network $G_n$, or for the whole network $G_n$ itself. Since it is the natural desire of an entity using transportation facilities for business or private purposes to keep the incurring costs as low as possible, a change in the transfer price p influences the decision over which of several possible paths $\Pi$ to have the transport performed. If the price p is lower on an alternative path $\Pi$ the demand for transport capacity can be directed to the cheaper path $\Pi$. Into this decision however, additional decision factors might be integrated, like demand-transfer costs, discount possibilities through special agreements with the capacity supplier, personal or business preferences, etc. This step can of course be automated by giving the corresponding system the decision rule according to which the decision is taken. This decision can influence only one unit, or also be applied to a stream of such units. The decision-making unit can hence make a decision at any point in time, depending on the price development, or make its decisions only at predetermined moments.

Once a decision has been made a demand-change-step can be carried out in which the demand $q_d$ for transporting the unit over the specific link ab or the alternative path $\Pi_2$ is decreased or increased in response to the calculated link-price p. This step effects a demand-routing in accordance with the calculated price p.

The price development is not only of interest for network users but, as it is the case with stocks and stock options, may be of interest for entities who want to make a profit from the price differences. Therefore, the price calculation can also be used by those entities and be followed by an action-step comprising one of a buy/hold/sell action for transportation bandwidth on the network $G_n$ in response to the calculated link-price p. The bandwidth, respectively transport capacity can hence be traded as a separate good.

The whole process described above can be executed several times sequentially to provide a link-price series comprising several of the subsequent calculated link-prices p. This link-price series then consists of a row of prices that are to appear after each other. This whole procedure can again be executed several times to provide several of the link-price series. The different series can for instance be combined to obtain an average thereof. Therefor, a discounting step can first be carried out, wherein the link-prices p within the link-price series are discounted back to their present-value, thereby providing discounted price series, followed by an integration step wherein the discounted price series are integrated for the network $G_n$ or a sub-network thereof, for obtaining therefrom a network present-value for the network $G_n$ or a sub-network thereof.

The calculation result, be it the single calculated price, the link-price series, or the network present-value, can be used as a decisive factor in a decision step comprising one of a buy/hold/sell action for the network $G_n$ or subnetwork.

Another possibility of use of the calculation result is the carrying out of an adaptation step wherein the transport capacity of the specific link or a different of the links in the network $G_n$ is changed in response to the calculated link-price p, e.g. by changing transmission equipment, such as switches, cross-connects, repeaters, multiplexers, amplifiers, fibers, or settings thereof. This can be particularly done by using a network hardware that provides the functionality of allowing to change network-specific settings, like a controllable transfer capacity, damping, amplification or the like.

Price Development for a Simple Network

The combination of link-price processes with Geographical Arbitrage and Liquidity, referred to as GAL, is considered as new. Hereinafter a study of a simple network is presented to help build up intuition. Considering an undirected triangular network as shown in FIG. 1 where two of the links, i.e. sides ab, ac start at the same price p and the starting price $p_{cb}$ of the third side cb is varied over different simulations is taken as the most basic market setup where geographical arbitrage can occur. This gives an isosceles triangle with respect to the prices p. Varying the ratio of one side to the other two sides between 10% and 190%, the total price to go around the triangle at the start runs from 2.1 to 3.9 in some arbitrary price units. The QoS offered is set on each side to unity and the allowed QoS is set to two. Thus there are always two different paths between any pair of distinct nodes. In this example a highly liquid market is considered, so arbitrage opportunities only last for the time-step on which they are observed. New geographical arbitrage opportunities may arise at each time-step but load-balancing, i.e. demand shifts, act to fully remove them on each subsequent time-step together with the usual price drivers embodied in the stochastic processes for the links.

Arbitrage Existence and Net Present Value

In FIG. 5 the results for the existence of arbitrage, i.e. how much it happens in this setup, and the Net Present Value (NPV) of these arbitrage opportunities relative to the NPV of the whole network, are summarized. For all NPV calculations continuous compounding with a constant 5% discounting is used. In the upper left panel (a) is shown the arbitrage versus the side length ratio for 10% (lowest line), 50%, 100%, 150%, 200% (highest line) of short-term price volatility at 0% long-term price trend uncertainty. The lower left panel (c) shows the net present value for this arbitrage. The right upper panel (b) shows the arbitrage versus the side length ratio for 0% (lowest line), 10%, 20%, 30%, 40% (highest line) of long-term price trend uncertainty at 10% of short-term price volatility. The lower right panel (d) shows the net present value for this arbitrage.

As expected, arbitrage opportunities increase in frequency with increasing volatility, as depicted in the upper panels (a), (b) of FIG. 5, whether this is short-term price volatility or from the volatility of the long-term price trend. Short- and long-term volatilities have different effects both in magnitude and in their relation with the shape of the network. This may be because when arbitrage occurs, the price that is affected is the observed price p and this feeds back directly into the process for p. Hence, when interactions with the long-term trend contribute to arbitrage this long-term trend, the mean logarithmic link-price $\overline{X}$ is not directly affected because it is the link-price p that is changed by arbitrage. Also in the base configuration, i.e. with zero volatility, there is no arbitrage and hence the long-term trend tries to keep it this way independent of any arbitrage effects. There is no connection between the long-term-trend price processes, so, if there was no arbitrage for them to start with, they can be regarded as attempting to keep it that way. In short, the independent long-term price trends on the different links act against arbitrage.

The NPV of arbitrage opportunities, as depicted in the lower panels of FIG. 5, also increases with the volatility to almost 2.5% of the NPV of the total network $G_n$. This is fact even with the considered highly liquid market. Long-term price-trend uncertainty—alone—is insignificant in creating valuable arbitrage opportunities less than 0.1% of the network NPV. This is probably because the scale of arbitrage opportunities, i.e. their value, is mostly determined by changes in the Brownian motion $\sigma dW$ and changes in the mean logarithmic link-price X are scaled down by the speed of the mean reversion 1.

GAL Effects on Observed Prices

It is assumable that the geographical distance between the nodes, i.e. the length of the respective links, is proportional to the mean price on that link. In the network in the form of an isocoles triangle the effect on the prices p on the two sides of the same length—which are termed the fixed-length sides, although their prices p do change at each time-step in each simulation—is examined and on the other side—which is termed the variable-length side in that the starting price ratio varies from 1:10:10 through 19:10:10, variable:fixed:fixed.

FIG. 6 shows the percentage change in the mean spot price p after one year, here 252 trading days, and the standard deviation of the observed changes in prices after one year as a percentage of mean prices. FIG. 6a shows the mean price change on a fixed-length link versus short-term volatility. FIG. 6b shows the price change on a variable-length link versus short-term volatility. FIG. 6c shows the standard deviation SD of the price change on a fixed-length link versus short-term volatility. FIG. 6d shows the standard deviation SD of the price change on a variable-length link versus short-term volatility. The numbers for the different lines, at the right side of the panels give the number n for the sides relation n:10:10, i.e. increasingly obtuse triangular networks. The crossed line gives in comparison the case for an isolated link (iso).

There is a change in the mean price observed after a year even without network effects, i.e. arbitrage-induced load-balancing. This is a common phenomenon in stochastic calculus for processes involving logarithms where volatility affects the mean and is even seen in geometric Brownian motion. It means that changes due to arbitrage effects are compared to a baseline that changes with short-term volatility. This baseline is indicated in all panels of FIG. 6 with light diagonal crossed lines.

Figure 6A:
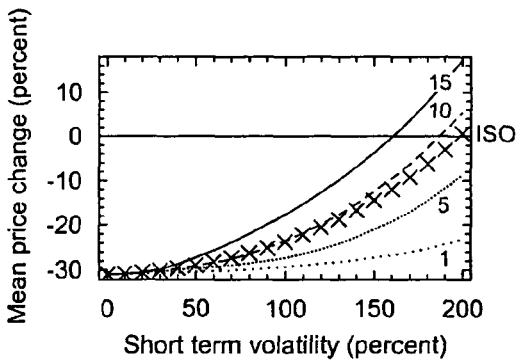
Figure 6B:
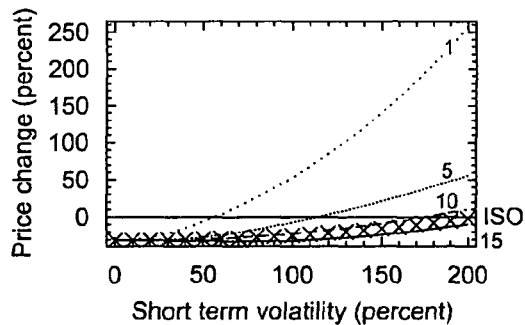
Figure 6C:
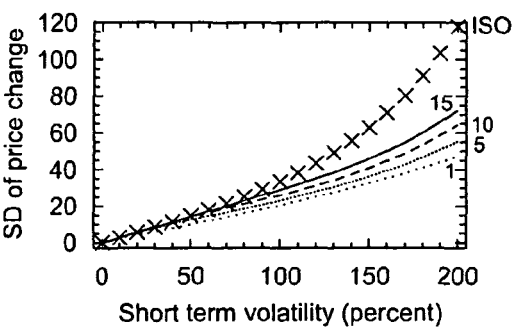
Figure 6D:
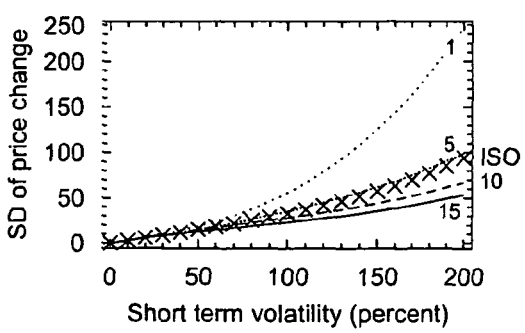
Figure 7A:
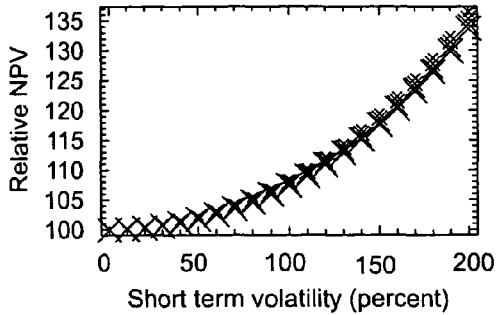
FIG. 7a the relative NPV versus short-term volatility.
Figure 7B:
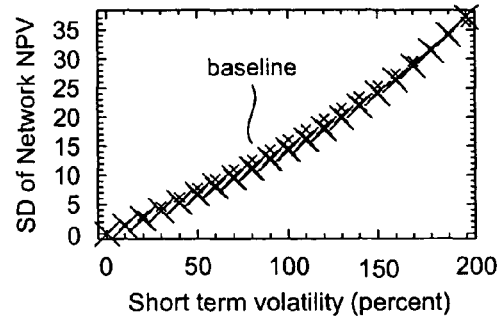
FIG. 7b the SD of the NPV versus short-term volatility.
Figure 7C:
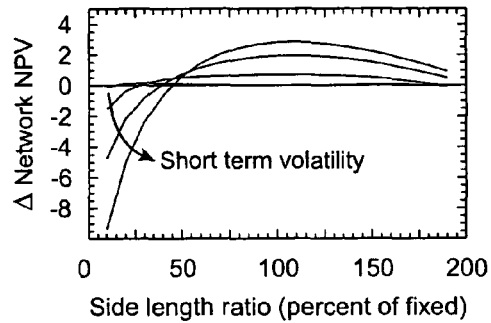
FIG. 7c the change in the NPV versus the side length ratio.
Figure 7D:
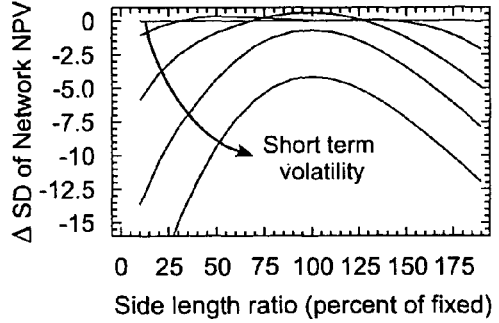
FIG. 7d the change in the SD of the NPV versus the side length ratio.

Any comparison of the left (fixed side) panels, FIG. 6a, 6c, with the right (variable side) panels, FIG. 6b, 6c shows that the prices of these two side categories behave differently, and indeed even in opposite ways. There are two effects here, firstly there is the simple difference in side lengths and, more subtly, there is the fact that two of the sides have a common length. The importance of this changes with the ratio of the side lengths. For very acute triangles, either of the fixed sides can easily cause arbitrage, whilst for very obtuse triangles only one side, the variable one, can easily generate arbitrage opportunities. Thus one expects to see most change relative to the baseline with acute triangular networks. This is observable in FIG. 6. Generally, the short side, as depicted with the heavy dots in the right top panel of FIG. 6, becomes longer and the longer sides, depicted with the heavy dots in the left top panel of FIG. 6, become shorter. The scale of these changes in the mean prices is very different. In the most acute case, the short side may increase in price by 250% rather than decreasing by the expected, i.e. baseline, case of around 5%; whereas the long side simply decreases in price by 30% rather than the expected case of around 5%. The baseline case will always be the same for the two different sides because when they are isolated they behave exactly the same, apart from a constant term which drops out when percentage changes are considered. Thus in the most acute case, 1:10:10, the arbitrage effects push the triangle towards 2.5:7:7 after one year. In the most obtuse case, 15:10:10, after one year a push towards 14:10.5:10.5 can be seen. The case 10:10:10 does, as could be expected from symmetry, appear to be a stable configuration in that its observed mean price changes little relative to the baseline. While arbitrage effects may push towards a symmetric situation, the long-term price process will act to maintain the original side ratio. Thus the stable limiting configuration for non-equilateral triangles will not be a symmetric 10:10:10 configuration but will be some balance between the two opposing forces.

Effects on the standard deviation of price changes are also mixed. There is a clear progression in the effect with increasing side ratio. For the variable side the standard deviation (SD) of the observed price-changes decreases going from acute to obtuse. The opposite is observed for the fixed side which approaches the baseline for increasing obtuseness. The variable-side SD crosses the baseline and continues to move away from it. With a very acute triangle the short, variable side is continuously pulled by both of the other sides through arbitrage effects, but this quickly decreases with increasing obtuseness.

Knowing the topology of alternative paths is important in understanding price dynamics in a network, and a quantification for a particular limited situation is given. These results suggest that network effects on the price—and on price variations—from geographical arbitrage can be at least as important as the effects on the price from the stochastic processes affecting each individual link.

GAL Effects on Network NPV

FIG. 7 shows the effect of geographical arbitrage liquidity on the NPV of a triangular network. In its upper left panel (a) the relative NPV versus short-term volatility is depicted. In its upper right panel (b) the SD of the NPV versus short-term volatility is depicted. In its lower left panel (c) the change in the NPV versus the side length ratio is depicted. In its lower right panel (d) the change in the SD of the NPV versus the side length ratio is depicted. In the lower panels c, d the short-term volatility is the parameter for the different curves, indicated by an arrow pointing towards rising short-term volatility. FIG. 7a, b incorporate the baseline, i.e. the effect of an isolated link (crossed line) whereas FIG. 7c, d incorporate the additional effect of the network, i.e. the connected links.

This NPV is the sum of the NPV for each edge of the triangle. As before for price changes on the individual links the baseline, isolated link, triangle NPV changes (increases) with increasing short-term volatility, as shown in the right top panel. The difference between different networks with different triangle ratios is less significant than the change in NPV relative to zero volatility which is nearly 140% of the zero-volatility NPV. The spread on triangle shape is less than 10%.

There is even less difference for the triangle shape for the SD of the network NPV in terms of the mean NPV for the same short-term volatility.

The lower panels (c), (d) of FIG. 7 show the additional effect of geographical arbitrage on the network NPV. For acute triangle networks there is a decrease in the mean network NPV of up to 10%, as shown in the left lower panel (c) of FIG. 7. This gradually changes with increasing obtuseness to an increase of more than 2% of the mean network NPV, maximizing at around equilateral configurations, and then gradually decreasing. Changes only become significant for short-term volatilities of 50% and higher. There is always a decrease in the SD of the network NPV as shown in the right lower panel (d) of FIG. 7. This decrease starts at around a 20% decrease for acute triangles at 200% short term volatility then becomes less pronounced at a side ratio of 10:10:10 before becoming more pronounced again to a decrease of 12% for very obtuse triangles.

Thus, network effects affect the total NPV around the triangle much less than the prices of the individual links. The difference in the percent mean price change for an individual link is up to 250% both up and down, depending on the side considered, whilst that effect for the total is always less than 10%. In some sense the triangular network is, at least in the mean, a self-hedging instrument whereas individual links are not. The decrease in the SD of the network NPV is easy to understand as whenever arbitrage is observed, prices are moved closer together to some extent depending on liquidity. In these experiments a sufficiently high liquidity serves to eliminate arbitrage during the next time-step after it was observed. There is a tradeoff between the value of the arbitrage opportunities and the extent to which no-arbitrage affects network price development. A lower liquidity would have increased the value of the arbitrage opportunities by having them last longer but would have reduced the other effects.

Price Development on Network Market

A realistic international topology is used to analyze the applicability of the results. Specifically, the potential presence of triangles of link contracts and their side ratio distribution is quantified.

Contract Network Construction

Next, a real-world version of the graph of indivisible bandwidth contracts is constructed. Since the market is today at a stage of expansion and transformation there is no single data source at present, certainly nothing like a topology of the underlying link contracts. One can construct a plausible future topology using information on commercial optical fiber backbone maps, node operator deployment plans and trades on the OTC bandwidth marketplaces. The result is a map of what could be offered by providers in the bandwidth market as indivisible contracts.

Figure 8:
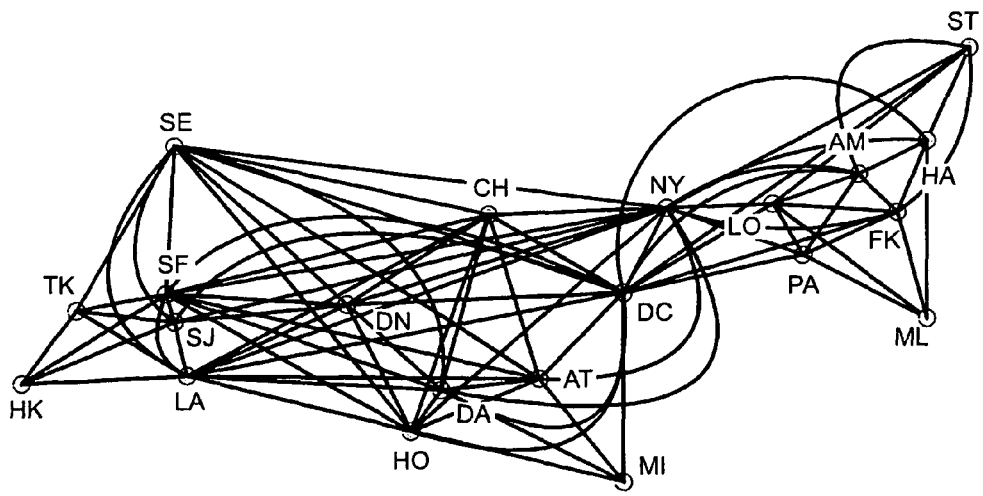
FIG. 8 a combined contract network topology for Asia, USA and Europe.

The contract map as depicted in FIG. 8 is constructed starting by overlaying several carrier backbone maps. FIG. 8 shows a combined contract network topology for Asia, USA and Europe, wherein the two-letter labels denominate city names, e.g. NY for New York, HK for Hong Kong a.s.o. An edge or link is created between two nodes in the map if there is at least one backbone which could connect these nodes without crossing any other node. If all possible network-level paths would cross other node locations, the link between the nodes cannot be offered as an indivisible contract. An example of this is the connection between Dallas and London. All network paths would cross the New York or Washington D.C. nodes, Dallas-London is therefore not an edge in this graph. As a rough approximation of an edge's length the geographical distance between two locations is computed using the Haversine formula. This method will generally underestimate the actual length of a network connection.

Some simple observations show that US is almost fully meshed, Europe to a lesser degree and US-Europe even less. What is not immediately visible, but relevant to this analysis, is the fact that many nodes are clustered in relatively small densely connected regions, with a few really long edges from one local cluster to another.

Contract Network Topology

Further above it was shown that network effects are found to be most pronounced with acute angle triangles where the side ratio is 1:10:10. There are 187 triangular subnetworks. Allowing the two "fixed" sides to differ by only 10%, 86 triangles remain, i.e. 46% of the total. Loosening this requirement to 20%, includes 129 triangles (69%) and to 30%, includes 175 triangles (94%).

Figure 9:
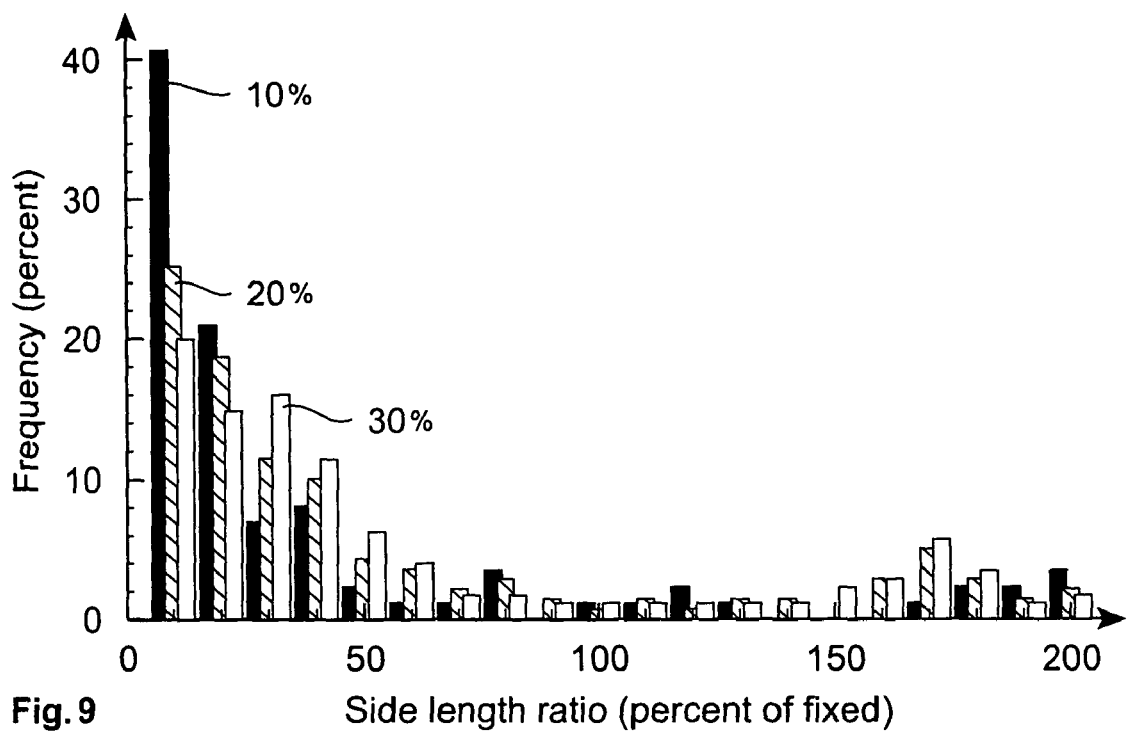
FIG. 9 frequency histograms of the triangle-side ratio-distribution for three different cases, using 10%-bins, FIG. 10a forwards curves for DS3 capacity from New York to Los Angeles (NY-LA), the delivery month starting in February 2001 and going to January 2002, with a contract duration of one month.

FIG. 9 shows frequency histograms of the triangle-side ratio-distribution for these three cases, using 10%-bins. These ratios are constructed from geographical distance ratios, not observed prices. However, at least some network costs are roughly linear with distance and these will dominate the mean trend v for long-distance paths. The black bars are triangles where two fixed-length sides are within 10% of the variable side, the grey bars are for 20%, the white bars for 30%.

The most immediate observation from this subnetwork classification is that there is a big number of acute-angled triangles (1-5:10:10) and that this does not change with a loosening of the requirement to be included. As this requirement is loosened there is the suggestion of a second peak at very obtuse angles, e.g. around 17:10:10. There are very few triangles with a side ratio between 5:10:10 and 15:10:10. The reason for such a high proportion of acute angles triangles in the potential contract network is that there are concentrations of high-tech and population on the East and West coasts of the USA with a few Midwestern additions. Thus, one gets short sides within such concentrations and much longer ones between different concentrations. The Atlantic and Pacific Oceans only serve to reinforce this trend, whatever the difference in cost between land and undersea transmission cables is.

It is thus concluded that the presence of a high proportion of acute-angled triangles in the network is a result of geography which is expected to be a very robust result. This implies that the network effects from geographical arbitrage that are present whatever the ratio is, will be very pronounced because these are most extreme for such topologies.

Hence a method is provided for constructing in particular a telecom commodity spot price process that reflects its unique characteristics. The commodity envisaged is point-to-point bandwidth between the nodes. Three factors combine to produce observed prices: link-price stochastic processes, geographical arbitrage, and liquidity. Geographical arbitrage affects the observed prices by shifting the demand to cheaper alternative paths at equivalent QoS.

Geographical arbitrage is a common feature of even highly liquid markets occurring on up to 35% of trading days. The effect is most pronounced for highly acute angled triangles. The short- and long-term volatility lead to different quantitative and qualitative network effects. Short-term volatilities of up to 200% in the individual-link processes are mean-reverting with a negative drift, so the actual observed short-term volatilities, without the network effects, only go up to 80%. The arbitrage-NPV is up to 2.2% of the network value with a high short-term volatility, but is insignificant (less than 0.1%) for a long term volatility $\rho$ of up to 40%.

In the simulation, the prices for network links decrease on average to reflect a decreasing technology cost v. Changes in the mean prices for the network links are altered by network effects (geographical arbitrage) and the difference increases with increasing short-term volatility. The price-change could be in either direction depending on the triangle side ratio and on which side is being examined. The volatility (standard deviation) of the observed prices is almost always reduced by network effects and this could be by up to half.

The total network present value NPV over one year sees a decrease of up to 10% with acute triangles and an increase of up to 3% for equilateral triangles due to the network effects. The volatility of the network value shows a consistent decrease of up to 30% with the least decrease for mildly acute triangles (5:10:10).

The link-price processes are inspired by jump diffusions as they appear in oil and electricity markets. The major difference is the explicit inclusion of geographical (no-)arbitrage terms that express the effects of the network topology on the price dynamics. Short- and long-term, dynamics with short- and long-term variations or alternatively a stochastic convenience yield are considered. The mean drift of the long term dynamics are here taken explicitly negative. The prices decrease on average due to technology development rather than they increase. The other additional new factors relative to these sources are the addition of jump- and spike terms and especially regime-switching models. Spikes are expected to be more important than price jumps. In oil markets price jumps are basically the result of changes in the status of OPEC and different states of this status may be prolonged. In the bandwidth market it would be legally difficult for the oligopolistic providers of the traded resource to create or sustain cartel pricing. In electricity markets, and possibly in bandwidth markets, spikes are usually the result of a lack of overprovision for peak demand of the resource combined with either equipment failure and/or some correlated increase in demand. Geographical arbitrage is a new factor for price dynamics not seen in other commodities. Load-balancing together with economic arguments can be used to move out of arbitrage situations and thus have a network effect on the link-prices.

Many applications of the described method are possible, some of which have already been illustrated herein: valuation of network infrastructure; design of network asset portfolios; decision support tools for network expansion or new-node location; price-scenario modelling. For example, recall that the value (NPV) of all three sides of a triangle is almost self-hedging with respect to network effects. Without a method to generate price scenarios for network infrastructure no quantitative optimization is possible and that is also an application of the current work.

Since the modelling of spot prices is only a beginning for network commodities, a next step is to extend this method to forward-markets as it has been done for electricity markets. The extension is nontrivial to the extent that the traded commodity is non-storable. Instead of deriving the forward-curve behavior from the spot price, the forward curve development is modeled explicitly and the spot price is just the shortest-term forward. Forward-markets are expected to be larger and more active than spot markets, as is true for most commodities. Another extension to this method is going into more depth on effects of rare events linked with QoS constraints.

The invention hence provides a method to model e.g. telecom commodity prices taking into account network effects inherent to bandwidth markets. These network effects produce highly significant changes in the price development and network value. These changes depend on the network topology for both, sign and magnitude. Comparison with a plausible future network topology show that extreme topologies, from a network-effect point of view, will be common.

Forward Pricing In the following, the application of the above described method to forward contracts is described. Derivatives, especially derivatives of forward contracts, are likely to be important for risk management and hedging. However there is currently no method available to price contingent claims where the underlying asset is a claim on some part of a network and non-storable. To date, geographical (no-)arbitrage has not been included in the pricing of contingent claims on forwards. Forward derivatives will be of larger importance for bandwidth than for many conventional commodities because bandwidth cannot be stored for later use. It is a non-storable commodity. Herein a method is presented to price a particular set of forward-derivative contracts. A forward contract is defined as a contract in which capacity is bought today to be used starting at a fixed date in the future and for a fixed duration. Herein a method for pricing European-style contingent claims on forwards is presented using no-arbitrage conditions and geographical no-arbitrage.

Today the instruments traded on bandwidth markets, mostly over-the-counter (OTC), are typically forward contracts covering long (months to years) periods. This is partly due to inefficient negotiation and contract settlement mechanisms. New switching technologies, public pooling, and inter-connection points are expected to hasten automation towards more liquid bandwidth markets and shorter contract periods as well as the development of a spot market. Additionally, fiber swaps are not uncommon. Forward derivatives, especially forward call options, are expected to appear given their appropriateness for risk management. Call options on forwards provide the right, but not the obligation, to use capacity in the future starting at some fixed date for a given duration upon payment of some price agreed when the contract is established. Possibly swaptions between different network providers will develop later together with more specialised instruments with unique applicability to a networked commodity. This would mimic the energy markets, which developed specialised quantity-flexible instruments.

Herein commodity bandwidth is defined as contracts for point-to-point capacity, e.g. T3=45 Mb/s, with defined delay, jitter, packet loss, etc. These commodity contracts have standardised, defined start times, e.g. every 15 minutes, hours starting at :00, days starting at 00:00, and lengths, e.g. 15 minutes, 1 hour, 1 day, 1 month, 1 year. Bandwidth is almost unique as a commodity in that it is not only bought and sold online but may also be used online. The most similar other commodity with an immediate link between trading and use, outside pure financial commodities such as interest rate products, is electricity. Thus, methods and insights can be applied, which were developed for modelling electricity prices, forward curves and derivatives, augmenting these with the particular features of point-to-point bandwidth. The most important common feature of telecom commodities and electricity where there is no storage capacity, e.g. in the USA and Australia, is that they are both non-storable commodities. That is, there is no way to store bandwidth and use it later. This has important technical and practical implications. This non-storability is the biggest difference from conventional commodities although that machinery remains very useful. The most important additional feature for modelling bandwidth, compared to other non-storable commodities, comes from the network aspect in that, in general, several paths are available at a given quality of service between any two points.

In the following it is shown how to price European-style contingent claims on telecom commodity forward contracts combining previous work on non-storable commodities, network effects and bandwidth spot-price modelling. An example calculation is given for a call option on a forward contract based on realistic information. European-style claims have a fixed date when they can be exercised. This is in contrast to more general-style claims that may offer a range of exercise possibilities, e.g. American or Bermudan options. Herein network effects are explicitly included in pricing contingent claims on forwards. This is a first step towards more general contingent claims-pricing and hedging for non-storable network commodities.

Technical Remarks on Forwards

By convention a forward contract is a transaction between two individuals whereas a futures contract is an exchange-traded instrument. Both contracts are for the future delivery of an asset at a fixed price agreed upon at the start of the contract. Because exchanges usually have margin requirements adjusted daily to reduce default risk, futures and forwards have different sensitivities to daily interest rate fluctuations. As interest-rate modelling is here not an objective, a constant risk-free interest rate r is assumed. Thus forward and futures prices are the same, and the two terms are used interchangeably.

Assuming the context of a filtered probability space $\Omega$, with a real-world probability measure P and events $\Im(t)$ revealed over a time $0 \leq t \leq T^*$, forward contracts $F(t,T)$ have maturities $t \leq T \leq T^*$, and trades occur in a fixed time interval $[0,T^*]$ where $T^*$ is a fixed time. $p(t)$, $0 \leq t \leq T^*$ denotes the spot price. This is a usual setting for discussion of forward- and derivative pricing.

Network Model

The bandwidth-trading market is represented by a contract graph G(N,L), where N are the nodes of the graph and L are the links between the nodes. A link in the contract graph G(N,L) represents an indivisible traded contract for the bandwidth between two nodes. For concreteness one may imagine that a standard contract is for T3 (45 Mb/s) capacity with defined delay, jitter, packet loss, etc. and several time-scales of contracts are available with standardised starting times e.g. every 15 minutes, hours starting at :00, days starting at 00:00, and lengths. This degree of liquidity is not yet present or at least not yet widely observed for bandwidth trades but, considering how electricity markets developed, may be an eventual situation. The nodes N are public pooling or inter-connection points where many carriers are present with the capability to arbitrarily cross-connect between networks. Thus paths may be assembled in a supplier-neutral manner.

The bandwidth is offered for sale on the market in the form of point-to-point contracts that will generally comprise several underlying links L at the network- or physical layer. Thus, the contract graph G(N,L) is an abstract view of network connectivity at the level of traded contracts, and links/paths in the contract graph G(N,L) do not map one-to-one to physical or network layer links or paths. The contract graph abstraction is useful for studying the network effects inherent in a bandwidth market. That is, the price development on any link L is not independent of the prices of neighbouring links as there is generally more than one way to connect two locations and buyers will choose the cheapest path if the other factors are equal e.g. the QoS.

Futures Price Properties

A Martingale, referred to as M(t), is a stochastic process whose expected future value E is the same as its current value, i.e. for $t_2 > t_1$, $$E[M(t_2)|\Im(t_1)] = M(t_1), \quad [25]$$

where $\Im(t_1)$ describes everything that is known up to $t_1$, including $M(t_1)$. Using the risk-neutral measure this means inter alia that the expected future value E is discounted back to the present. If this value E were not the same as the current value then there would be the opportunity for a certain win at no cost, i.e. an arbitrage opportunity. There are additional technical details to do with the fact that this only makes sense when the risk-neutral measure is unique.

Herein the primary traded commodities in the bandwidth telecom commodity market are futures contracts with fixed maturities and strike prices. The prices of individual futures contracts over time are Martingales under the risk-neutral measure labelled Q and being equivalent to the real-world probability measure P, otherwise the futures market contains arbitrage opportunities. The risk-neutral measure is a construct used in the pricing of derivative contracts. This observation is independent of whether the asset on which the forward is written is storable or non-storable because the forward contract itself is storable.

Because bandwidth is non-storable, there is no reason to expect that the spot price p will be a Martingale under the risk-neutral measure. This does not mean that the market has arbitrage opportunities because the spot is not a tradable asset. In fact the spot price process does not exist in the sense that the underlying asset can be bought at one time and sold at another time—which is usually the definition of tradable item. A spot price process can be said to exist when it is possible to substitute the asset bought at one time for the asset bought at another time. For example a share of a stock bought today can be substituted for one bought tomorrow, and the buying person cannot distinguish between the two.

In a more technical language, non-storability means that the spot commodity cannot be part of any self-financing strategy. This limitation means that spot price process for the spot price p(T) is really just the set of forward prices F(T,T) at maturity. In this sense the spot price process does exist and is observable. The forward prices F(T,T) at maturity, for any maturity $0 \leq T \leq T^*$, are equivalent to the spot prices p(T), at that time—they are both the price p at the time T for delivery at the time T. It is assumed that the delivery of the forward assets is defined in the same way as the delivery of the spot assets. Also, F(T,T), $0 \leq T \leq T^*$, need not be a Martingale because it is non-storable. For non-storable commodities the equivalence between F(T,T) and p(T) is complete.

Futures/Spot (Non-)Linkage

For Storable Investment Commodities, the Conventional Relationship Between Spot- and Forward prices is given by comparing forward prices with the strategy of buying the spot and holding it to maturity of the forward to arrive at $$F(0,T) = p(0)e^{(r+u-y)T}, \quad [26]$$

where p(t) is the spot price at a time t; r is the (constant) interest rate; u are the storage costs, which are a fixed proportion of the spot price p, and y is the convenience yield or fudge factor required to make both sides equal. The fudge factor y is generally rationalised as the benefit from actually holding the commodity, e.g. the ability to benefit from temporary increases in the price p, also called shortages. A more sophisticated understanding of this term is to do with long- and short-term price dynamics. This relationship does not hold when the underlying asset is non-storable.

European Futures Options and Derivatives

Futures options are relatively simple to price and herein futures call options will be considered. At maturity, the payoff from a European futures call option is max(F(T,T)X,0) where X is the strike price, and F(T,Y)≡p(T) so also the payoff is equal to max(p(T)X,0). p(T) is not required to be a Martingale, although F(t,Y) is with respect to t but not with respect to T. So in effect the futures call option can be treated as a call option on the spot. The Black-Scholes option-pricing formula is not valid here because it assumes storability of the spot market asset. Equivalently the Black futures-option formula assumes log-normality of the futures price distribution, which in general, owing to the network effects, will also not be valid.

Now Q is the risk-neutral measure, and it is assumed that this exists and is unique. From the definition of the risk-neutral measure Q in general, follows $$E_Q[F(T,T)]e^{-rT} = F(0,T)e^{-rT} \quad [27]$$

because all investments—by definition—have the same expected return as the riskless rate under the risk-neutral measure Q. In other words, F(t,Y) is a Martingale under the risk-neutral measure Q. Equation [27] is a definition of, or at least a constraint on, the risk-neutral measure Q. Which of the two it is depends on other assumptions, especially the number of parameters in the stochastic process describing the forward price-development. The $e^{-rT}$ term on both sides allows to compare present values when the present values are taken at time zero.

In Equation [27] the forward contract F(t,T) is observed today, i.e. at time zero, on the market.

This forward contract F(0,T) is the amount to be paid at the time T, wherein the term $e^{-rT}$ converts this to the present value today.

The risk-free rate of interest r is known, which is assumed to be constant, the maturity T of the futures contract F is also known. F(t,t)≡p(t), so if one possesses a model for p(t) then one can calibrate that model to the market's expectation as expressed by the Equation [27]. For example when the geometric Brownian motion dp/p=μdt+cdW is used to describe stock prices, this calibration process results in the stock price drift term μ being replaced by the risk-free rate of interest r. After having calibrated p(t) to the market's expectations, i.e. choosing the risk-neutral measure Q such that the equation [27] holds, the expected price of a call option on a futures contract F with the strike price X is defined by $$E_Q[\max(F(T,T)-X, O)] \quad [28]$$

$$E_Q[\max(S(T)-X, O)]. \quad [29]$$

Here it is not yet proposed a form for the price p(t), which is vital to these equations and the option pricing. So far all network effects, i.e. geographical arbitrage, have been hidden inside p(t).

Equation [28] may be generalised to obtain the price p of any contingent claim C(O) that depends only on the distribution of the futures contract F(T,T), some set of deterministic parameters D and is European style i.e. is exercised only at T:

$$C(O,D) = E_Q[C(F(T,T),D)] \quad [30]$$

$$= E_Q[C(S(T),D)]. \quad [31]$$

In this method of development of a contingent claim price it is to be highlighted how the unique characteristics of bandwidth have been used in the development because there are several subtleties involved. Two important characteristics are non-storability and the potential for geographical arbitrage present in a network.

Non-storability, as described above, breaks the link between the price p(O) and the futures contract F(O,T) thus one cannot go directly from spot prices today to futures prices today and then to futures options. This means that futures are traded commodities in their own right as this is the way to assure future bandwidth and leads to Equation [27].

Geographical arbitrage has been used to describe the fact that at a given QoS there may be many equivalent routes between two locations and that the direct route, i.e. a connected set of links, when this exists, may not always be the cheapest. The difficulty of discovering an alternate and cheaper route leads to possible arbitrage opportunities together with the dynamic nature of link prices. These arbitrage opportunities can be observed together with pseudo-polynomial algorithms for their detection. This dynamic is contained within the spot price process and already has been described above.

EXAMPLE

Forward Call Option Pricing

Figure 10A:
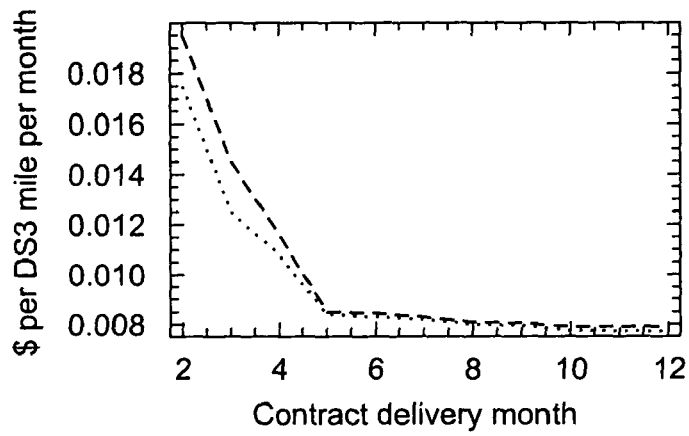
FIG. 10b forwards curves for DS3 capacity from New York to Los Angeles (NY-LA), the delivery month starting in February 2001 and going to January 2002, with a contract duration of one year at a monthly rate, FIG. 11a the distribution of F(T,T) in three different network situations and without a network, FIG. 11b the option price versus the strike price for a call option on forward price with and without a network, FIG. 12 the percentage difference of the call option prices in two network cases and an isolated-link case.
Figure 10B:
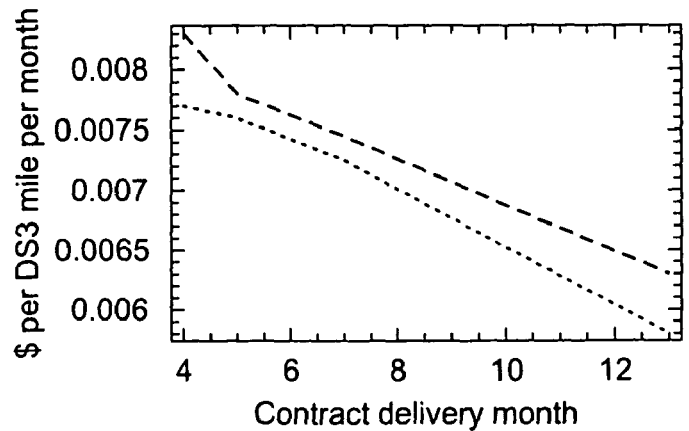

In this section the steps are performed to price a European-style call option on a forward contract for a one-month DS3 capacity from New York to Los Angeles (NY-LA) starting 10 months away from February 2001 in December 2001, i.e. 210 trading days out, based on data from FIGS. 10a, b and realistic assumptions. FIG. 10a shows the forwards curves for DS3 capacity from New York to Los Angeles (NY-LA), with the delivery month starting in February 2001 and going to January 2002, and with a contract duration of one month. FIG. 10b shows the forwards curves for DS3 capacity from New York to Los Angeles (NY-LA), with the delivery month starting in February 2001 and going to January 2002, and with a contract duration of one year at a monthly rate. The dotted lines are buy quotes, the dashed lines depict sell quotes.

Three pricing situations are considered.
  ignoring network effects and the possibilities of geographical arbitrage completely;
  including a possible alternative route via Chicago (CH), so the network is an obtuse triangle NY-CH-LA where the side ratio is set to 1:1:1.9, and
  including a possible alternative route via San Francisco (SF), so the network is a highly acute triangle NY-LA-SF where the side ratio is set to 1:0.1:1.

These are three different network situations that the market makers would take into account in setting forward prices. In general, different network situations will lead to different forward prices with different observed volatilities in the market. These will be strongly affected by the extent of geographical arbitrage. For the purposes of comparing option values in these three situations it is here assumed that the forward prices quoted in all three cases are the same and so are their observed volatilities. While this is artificial it does allow to ask to what extent option values, but not forward prices, are influenced by network effects.

A constant interest rate was used for discounting the forward prices given in FIG. 10 back to the present. The used market-observed data were forward prices for December 2001, F(0,T), and for February 2001, which were used as p(0). Having no observations of forward volatility for December 2001, the value was set to 50% as a possible value. From FIG. 10 it can be seen that forward prices are expected to halve on this timescale.

Results

The risk-neutral probabilities Q were obtained indirectly by calibrating the Equations [23] and [24] according to Equation [27], i.e. the no-arbitrage condition, and to the given forward volatility. Given that there are four equations and two constraints, the risk-neutral measure is not unique. However, using the short-term volatility and the long-term trend as calibration parameters should be the least ambiguous choice. Whilst this fixes the first two moments of the distribution the higher moments are free and so is the shape of the distribution.

The parameters for the networks (NY-CH-LA and NY-LA-SF) are different from those for the isolated link and so are the calculated distribution shape parameters. FIG. 11a shows the actual distributions of F(T,T) in the three different network situations (solid line) and without a network (light crossed line). Although the shape parameters may be different, the actual distributions appear very close to each other. FIG. 11b shows the option price versus the strike price for a call option on forward price with and without a network, the strike and option prices being relative to F(0, T). Using the risk-neutral probability distribution Q, which can be seen explicitly in FIG. 11a, one can then calculate call option values on December forward contracts using Equation [29]. FIG. 11b contains the forward call option values discounted back to the start (0=February) in units of F(0,T) with respect to strike price in the same units. As before, the curves of forward call option values for the three different cases appear very close to each other.

FIG. 12 shows the percentage difference of the call option prices in the two network cases (solid line) from the isolated-link case (light crossed line). Up to a strike price of twice the forward price the difference in option values is less than 15%. Above this strike price it appears that there is numerical instability. Looking at FIG. 11a, b confirms this impression as the option values are becoming very low at these high strike prices so there is an instability due to division by small-numbers.

The option prices on 10-month forward contracts are very similar to each other for the networks considered, including no network. It appears that for this case the inclusion of geographical arbitrage and considering the entire network are not necessary—it suffices to consider an isolated link provided high accuracy is not required and strike prices are not extreme, e.g. less than twice the forward price. It appears, in this case, that fixing the first two moments of the forward distribution is sufficient for network-independent option pricing. This is rather unexpected because geographical no-arbitrage is a highly non-linear condition, it resembles a a=min(a, b+c) operator. The reason may be that the forward is so far into the future that the accumulation of the no-geographical-arbitrage condition falls under the central limit theorem and results in a log-Normal-like distribution. If this is the case then the small differences seen in forward option prices at ten months may be much greater for shorter-dated options.

It has hence been shown how to price European-style contingent claims on futures contracts of the same maturity. This involves calibrating the spot price process, which represents a non-storable commodity to the market-observed futures price, a Martingale under the risk-neutral measure Q. The spot price process explicitly includes network effects, notably those from geographical arbitrage, and the markets' response to such conditions through load-balancing. For a European call option on a 10 month forward, it is found that the option prices are independent of the networks considered although the presence of geographical no-arbitrage requires different calibration parameters for different network topologies.

Small differences are present (less than 15%), and it is speculated that these differences may increase for shorter-dated contingent claims. Equally this result does not necessarily imply anything about non-European-style claims—these generally are affected by differences in price trajectories or by their envelope.

As it was chosen to focus on European-style contingent claims it was not necessary to model the forward curve development explicitly because one could rely on $F(T,T) \equiv p(T)$ at maturity. To model more general instruments such as swing options, forward curve modelling would be used.

The most direct extension of this work is to pricing arbitrary contingent claims. This uses explicit modelling of forward price curve dynamics, i.e. $dF(t,Y)$ with respect to t. This modelling is non-trivial because then $F_{ab}(t, T)$ for each link (a, b) must be a Martingale and the forward contract graph as a whole must also have no geographical arbitrage. It is not sufficient to simply take a forward curve model without modification from the literature and apply it. These models would have $F_{ab}(t, T)$ as Martingales but then corrections for geographical arbitrage would be required which would remove the Martingale property. This property would then have to be restored.

In conclusion it has been shown how to price European-style contingent claims on forward contracts of the same maturity using no-arbitrage considerations. Forward prices were used as an input because bandwidth is not storable. Network effects are included via the spot price process on which no-geographical arbitrage is imposed over the network at any point in time and $F(T,T) \equiv p(T)$ is used to make the link between spot and forward prices.

The described embodiments are combinable in part as well as in whole. It is obvious for the person skilled in the art that the present invention can be realized in hardware, software, or a combination of these. Also, it can be implemented in a centralized fashion on one single computer system, or in a distributed fashion where different elements are spread across several interconnected computers or computer systems, whereby any kind of a computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Any disclosed embodiment may be combined with one or several of the other embodiments shown and/or described. This is also possible for one or more features of the embodiments. It is obvious that a person skilled in the art can modify the shown arrangements in many ways without departing from the gist of the invention which is encompassed by the subsequent claims.

The invention claimed is:

1. A computer-implemented method of calculating for a network commodity, a new market price for one unit of a constituent commodity, the unit of the constituent commodity comprises a specific quantity of the commodity, where the network commodity is defined by the property that constituent commodities are represented by links of a network, the links having nodes at their end points, and the constituent commodities are usable to construct further network commodities provided that the constituent commodities share a common node, the constituent commodities comprise commodities such that units of these commodities are indistinguishable provided that they have the same end nodes and that there is a continuous path between the nodes, where a path is defined as a series of links with common nodes, and wherein the network commodity is bandwidth, the computer comprising a processor programmed to perform:

determining, using the digital processor, a price difference between a market price for one unit of a first constituent commodity defined by a specific link in the network representing the networked commodity and market prices for one unit of each of the alternative constituent commodities, defined by links in the network, where the alternative constituent commodities form an alternative path between the same nodes as the first constituent commodity and excluding the first constituent commodity;

determining, using the digital processor, a link-price change for the market price for one unit of the first constituent commodity defined by the specific link, and a link-price change for the market prices for one unit of each of the alternative constituent commodities defined by the links in said alternative path, in response to said determined price difference;

combining, using the digital processor, for the market price for one unit of the first constituent commodity defined by the specific link, the determined link-price changes from the market prices for one unit of the first constituent commodity defined by the specific link and for one unit of each of the alternative constituent commodities defined by the links of the network commodity, to determine a total link-price-change for one unit of the first constituent commodity defined by the specific link, and merging, using the digital processor, said determined total link-price-change, for one unit of the first constituent commodity defined by the specific link, with a market-induced price change in the market price for one unit of the first constituent commodity, to calculate the new market price for one unit of the first constituent commodity, said market-induced price change being driven by at least one random variable, wherein said processor is configured to access network information, through a network interface, comprising the link-price and the price for using, instead of the specific link, an alternative path.

2. The computer-implemented method according to claim 1, wherein said market-induced price change comprises one or more functions of: Brownian price-change, Poisson price-change semi-Markov price-change, Levy price-change or Ito price-change, and the previous price.

3. The computer-implemented method according to claim 1, wherein the market-induced price change is modeled to comprise a function for price-spikes and/or price-jumps.

4. The computer-implemented method according to claim 1, wherein the determination of the link-price change is modeled using one or more of: a term (for the quantification of market liquidity, an arbitrage-correction function, and the previous price.

5. The computer-implemented method according to claim 1, wherein the link-price change on the specific link and the link-price change in the links of the alternative path are all based on a common demand change.

6. The computer-implemented method according to claim 1, wherein the determination of the link-price comprises:
    determining an amount of an existing transport capacity demand that is to be shifted from said specific link to said alternative path, in response to said determined price difference; and
    determining the link-price change effected by the determined transport capacity demand that is to be shifted, on the link-price for using said specific link and on the link-price for using the links in said alternative path.

7. The computer-implemented method according to claim 6, wherein the transport capacity demand is modeled to have a price elasticity.

8. The computer-implemented method according to claim 6, wherein the transport capacity demand is approximated with a linear function.

9. The computer-implemented method according to claim 6, wherein, on the links, a transport capacity supply is modeled as having a constant elasticity.

10. The computer-implemented method according to claim 6, wherein the amount of demand to be shifted from the specific link to the alternative path is positive.

11. The computer-implemented method according to claim 1, wherein the method is carried out for each of said links in said network.

12. The computer-implemented method according to claim 1, wherein said network comprises a communication network.

13. The computer-implemented method according to claim 1, further comprising deciding in view of the calculated link-price, whether to increase, decrease or maintain the transport capacity demand for transporting a unit, over said specific link or said alternative path.

14. The computer-implemented method according to claim 1, further comprising changing the transport capacity demand for transporting the unit over said specific link or a said alternative path in response to the calculated link-price.

15. The computer-implemented method according to claim 1, further comprising one of a buy, hold, or sell action for transportation bandwidth on said network in response to the calculated link-price.

16. The computer-implemented method according to claim 1, wherein the method is executed several times sequentially to provide a link-price series comprising several of said subsequent calculated link-prices.

17. The computer-implemented method according to claim 16, wherein the method is being executed several times to provide several of said link-price series.

18. The computer-implemented method according to claim 17, further comprising:
    discounting the link-prices within said link-price series back to their present-value, thereby providing a discounted price series; and
integrating said discounted price series for the network or a sub-network thereof, to obtain a network present-value for the network or a sub-network thereof.

19. The computer-implemented method according to claim 18, further comprising one of a buy/hold/sell action for said network or subnetwork.

20. The computer-implemented method according to claim 19, further comprising changing all adaptation step wherein the transport capacity of the specific link or a different of said links in said network in response to the calculated link-price.

21. A computer-readable storage media tangibly embodying a program of machine-readable instructions executable by a digital data processor for performing a method of calculating for a network commodity, a new market price for one unit of a constituent commodity, the unit of the constituent commodity comprises a specific quantity of the commodity, where the network commodity is defined by the property that constituent commodities are represented by links of a network, the links having nodes at their end points, and the constituent commodities are usable to construct further network commodities provided that the constituent commodities share a common node, the constituent commodities comprise commodities such that units of these commodities are indistinguishable provided that they have the same end nodes and that there is a continuous path between the nodes, where a path is defined as a series of links with common nodes, and wherein the network commodity is bandwidth, said method comprising:
    determining a price difference between a market price for one unit of a first constituent commodity defined by a specific link in the network representing the networked commodity and market prices for one unit of each of the alternative constituent commodities, defined by links in the network, where the alternative constituent commodities form an alternative path between the same nodes as the first constituent commodity and excluding the first constituent commodity;
    determining a link-price change for the market price for one unit of the first constituent commodity defined by the specific link, and a link-price change for the market prices for one unit of each of the alternative constituent commodities defined by the links in said alternative path, in response to said determined price difference;
    combining, for the market price for one unit of the first constituent commodity defined by the specific link, the determined link-price changes from the market prices for one unit of the first constituent commodity defined by the specific link and for one unit of each of the alternative constituent commodities defined by the links of the network commodity, to determine a total link-price-change for one unit of the first constituent commodity defined by the specific link, and
    merging said determined total link-price-change, for one unit of the first constituent commodity defined by the specific link, with a market-induced price change in the market price for one unit of the first constituent commodity, to calculate the new market price for one unit of the first constituent commodity, said market-induced price change being driven by at least one random variable.

22. The computer-readable storage media according to claim 21, wherein the program code means is stored on a computer-readable medium.

23. A network-pricing device comprising:
    a computer program product comprising program code means for performing a method of calculating for a network commodity, a new market price for one unit of a constituent commodity, the unit of the constituent commodity comprises a specific quantity of the commodity, where the network commodity is defined by the property that constituent commodities are represented by links of a network, the links having nodes at their end points, and the constituent commodities are usable to construct further network commodities provided that the constituent commodities share a common node, the constituent commodities comprise commodities such that units of these commodities are indistinguishable provided that they have the same end nodes and that there is a continuous path between the nodes, where a path is defined as a series of links with common nodes, and wherein the network commodity is bandwidth, said method comprising:

determining a price difference between a market price for one unit of a first constituent commodity defined by a specific link in the network representing the networked commodity and market prices for one unit of each of the alternative constituent commodities, defined by links in the network, where the alternative constituent commodities form an alternative path between the same nodes as the first constituent commodity and excluding the first constituent commodity;

determining a link-price change for the market price for one unit of the first constituent commodity defined by the specific link, and a link-price change for the market prices for one unit of each of the alternative constituent commodities defined by the links in said alternative path, in response to said determined price difference; combining, for the market price for one unit of the first constituent commodity defined by the specific link, the determined link-price changes from the market prices for one unit of the first constituent commodity defined by the specific link and for one unit of each of the alternative constituent commodities defined by the links of the network commodity, to determine a total link-price-change for one unit of the first constituent commodity defined by the specific link, and merging said determined total link-price-change, for one unit of the first constituent commodity defined by the specific link, with a market-induced price change in the market price for one unit of the first constituent commodity, to calculate the new market price for one unit of the first constituent commodity, said market-induced price change being driven by at least one random variable; a processor for executing the program code means; and a network interface, wherein said processor is configured to access, through the network interface, network information comprising the link-price and the price for using, instead of the specific link, an alternative path.

24. The network-pricing device according to claim 23, further comprising a second network interface via which the processor is configured to decrease or increase the transport capacity demand for transporting the unit over the specific link or the alternative path in response to the calculated link-price and/or via which the buy, hold, or sell action for transportation bandwidth on the network or for the network or subnetwork can be effected.

25. The network-pricing device according to claim 23, further comprising a controller via which the processor is configured to change the transport capacity of the specific link or a different of said links in said network.

* * * * *